United States Patent
Ota et al.

(10) Patent No.: US 11,961,990 B2
(45) Date of Patent: *Apr. 16, 2024

(54) SYSTEMS AND METHODS FOR INFUSION MIXING A SLURRY-BASED ELECTRODE

(71) Applicants: 24M Technologies, Inc., Cambridge, MA (US); Kyocera Corporation, Kyoto (JP)

(72) Inventors: Naoki Ota, Lexington, MA (US); Takaaki Fukushima, Okayama (JP); Yutaka Wakai, Brookline, MA (US); Motoi Tamaki, Osaka (JP); Sean Simon, Newburyport, MA (US); Nicholas Varamo, Somerville, MA (US); Duy Le, Boston, MA (US); Taison Tan, Pasadena, CA (US); Hiromitsu Mishima, Kirishima (JP)

(73) Assignees: 24M Technologies, Inc., Cambridge, MA (US); Kyocera Corporation, Kyoto (JP)

( * ) Notice: Subject to any disclaimer, the term of this patent is extended or adjusted under 35 U.S.C. 154(b) by 381 days.

This patent is subject to a terminal disclaimer.

(21) Appl. No.: 17/227,577

(22) Filed: Apr. 12, 2021

(65) Prior Publication Data

US 2022/0077445 A1  Mar. 10, 2022

Related U.S. Application Data

(63) Continuation of application No. 15/407,669, filed on Jan. 17, 2017, now Pat. No. 11,005,087.
(Continued)

(51) Int. Cl.
*H01M 4/04* (2006.01)
*B28B 3/00* (2006.01)
(Continued)

(52) U.S. Cl.
CPC ........... *H01M 4/0416* (2013.01); *B28B 3/006* (2013.01); *B28B 3/20* (2013.01); *B28B 11/04* (2013.01);
(Continued)

(58) Field of Classification Search
None
See application file for complete search history.

(56) References Cited

U.S. PATENT DOCUMENTS 3,255,046 A    6/1966  Ghormley
3,360,401 A   12/1967  Grasselli
(Continued)

FOREIGN PATENT DOCUMENTS

CN    1209219      2/1999
CN  101213700      7/2008
(Continued)

OTHER PUBLICATIONS

Office Action for Canadian Application No. 2,876,416, dated Jul. 4, 2019, 4 pages.
(Continued)

*Primary Examiner* — Seyed Masoud Malekzadeh
*Assistant Examiner* — Timothy G Hemingway
(74) *Attorney, Agent, or Firm* — COOLEY LLP

(57) ABSTRACT

Embodiments described in this application relate generally to a system, an apparatus and/or methods for manufacturing electrodes by infusion electrolyte into compacted electrode materials. In some embodiments, a working electrode materials can be produced using an infusion mixing and manufacturing process. In some embodiments, a single-sided finished electrode can be produced directly from a dry powder mixture using an infusion mixing and manufacturing process. In some embodiments, a double-sided finished electrode can be produced directly from a dry powder
(Continued)

mixture using an infusion mixing and manufacturing process. The electrodes produced by an infusion mixing and manufacturing process generally perform better than those produced by non-infusion processes.

19 Claims, 15 Drawing Sheets

Related U.S. Application Data

(60) Provisional application No. 62/279,281, filed on Jan. 15, 2016.

(51) Int. Cl.
  *B28B 3/20* (2006.01)
  *B28B 11/04* (2006.01)
  *B30B 11/02* (2006.01)
  *H01G 11/30* (2013.01)
  *H01G 11/86* (2013.01)
  *H01M 4/139* (2010.01)
  *H01G 11/50* (2013.01)

(52) U.S. Cl.
  CPC ............ *B30B 11/027* (2013.01); *H01G 11/30* (2013.01); *H01G 11/86* (2013.01); *H01M 4/0404* (2013.01); *H01M 4/043* (2013.01); *H01M 4/139* (2013.01); *H01G 11/50* (2013.01)

(56) References Cited

U.S. PATENT DOCUMENTS

| | | | |
|---|---|---|---|
| 3,540,933 A | 11/1970 | Boeke | |
| 3,540,934 A | 11/1970 | Boeke | |
| 3,551,207 A | 12/1970 | Herbst | |
| 3,996,064 A | 12/1976 | Thaller | |
| 4,018,971 A | 4/1977 | Sheibley | |
| 4,126,733 A | 11/1978 | Doniat | |
| 4,159,366 A | 6/1979 | Thaller | |
| 4,192,910 A | 3/1980 | Frosch | |
| 4,318,969 A | 3/1982 | Peled | |
| 4,320,180 A | 3/1982 | Nozaki | |
| 4,335,191 A | 6/1982 | Peled | |
| 4,352,864 A | 10/1982 | Struthers | |
| 4,370,392 A | 1/1983 | Savinell | |
| 4,375,501 A | 3/1983 | Peled | |
| 4,382,116 A | 5/1983 | Gahn | |
| 4,410,609 A | 10/1983 | Peled | |
| 4,431,718 A | 2/1984 | Bernard et al. | |
| 4,443,522 A | 4/1984 | Struthers | |
| 4,456,665 A | 6/1984 | Peled | |
| 4,461,815 A | 7/1984 | Peled | |
| 4,485,154 A | 11/1984 | Remick et al. | |
| 4,517,258 A | 5/1985 | Bronoel | |
| 4,576,878 A | 3/1986 | Gahn | |
| 4,614,693 A | 9/1986 | Hashimoto et al. | |
| 4,755,440 A | 7/1988 | Peled | |
| 4,784,924 A | 11/1988 | Savinell et al. | |
| 4,956,244 A | 9/1990 | Shimizu et al. | |
| 5,079,104 A | 1/1992 | Roche et al. | |
| 5,308,718 A | 5/1994 | Eidler | |
| 5,368,952 A | 11/1994 | Sonneveld | |
| 5,441,820 A | 8/1995 | Siu et al. | |
| 5,558,961 A | 9/1996 | Doeff et al. | |
| 5,591,538 A | 1/1997 | Eidler | |
| 5,600,534 A | 2/1997 | Eidler | |
| 5,601,943 A | 2/1997 | Eidler | |
| 5,610,802 A | 3/1997 | Eidler | |
| 5,650,239 A | 7/1997 | Lex | |
| 5,656,390 A | 8/1997 | Kageyama | |
| 5,674,802 A | 10/1997 | Sheppard | |
| 5,759,711 A | 6/1998 | Miyabayashi | |
| 5,792,576 A | 8/1998 | Xing et al. | |
| 5,817,436 A * | 10/1998 | Nishijima | H01M 10/0525 429/223 |
| 5,837,397 A | 11/1998 | Xing | |
| 5,849,427 A | 12/1998 | Siu et al. | |
| 5,869,200 A | 2/1999 | Nunnally | |
| 5,912,088 A | 6/1999 | Ernst | |
| 6,143,443 A | 11/2000 | Kazacos et al. | |
| 6,203,947 B1 | 3/2001 | Peled | |
| 6,242,125 B1 | 6/2001 | Eidler | |
| 6,261,714 B1 | 7/2001 | Eidler | |
| 6,277,520 B1 | 8/2001 | Moutsios et al. | |
| 6,296,958 B1 | 10/2001 | Pinto et al. | |
| 6,447,943 B1 | 9/2002 | Peled | |
| 6,455,187 B1 | 9/2002 | Tomazic | |
| 6,468,688 B2 | 10/2002 | Kazacos | |
| 6,492,047 B1 | 12/2002 | Peled | |
| 6,497,973 B1 | 12/2002 | Amendola | |
| 6,551,745 B2 | 4/2003 | Moutsios et al. | |
| 6,562,514 B1 | 5/2003 | Kazacos | |
| 6,689,507 B1 | 2/2004 | Tsutsumi et al. | |
| 6,720,107 B1 | 4/2004 | Holtom | |
| 6,764,789 B1 | 7/2004 | Sekiguchi | |
| 6,811,911 B1 | 11/2004 | Peled | |
| 6,979,512 B2 | 12/2005 | Phillips | |
| 6,986,966 B2 | 1/2006 | Clarke | |
| 7,033,696 B2 | 4/2006 | Clarke | |
| 7,078,123 B2 | 7/2006 | Kazacos | |
| 7,214,443 B2 | 5/2007 | Clarke et al. | |
| 7,252,905 B2 | 8/2007 | Clarke | |
| 7,270,911 B2 | 9/2007 | Clarke | |
| 7,297,437 B2 | 11/2007 | Clarke | |
| 7,320,844 B2 | 1/2008 | Skyllas-Kazacos | |
| 7,338,734 B2 | 3/2008 | Chiang et al. | |
| 7,413,824 B2 | 8/2008 | Peled et al. | |
| 7,521,149 B2 | 4/2009 | Medeiros | |
| 7,560,189 B2 | 7/2009 | Clarke | |
| 7,625,663 B2 | 12/2009 | Clarke | |
| 8,097,364 B2 | 1/2012 | Reynolds | |
| 8,133,629 B2 | 3/2012 | McLean et al. | |
| 8,722,226 B2 | 5/2014 | Chiang et al. | |
| 8,722,227 B2 | 5/2014 | Chiang et al. | |
| 8,778,552 B2 | 7/2014 | Chiang et al. | |
| 8,993,159 B2 | 3/2015 | Chiang et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,236,607 B2 | 1/2016 | Wang et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |
| 9,401,501 B2 | 7/2016 | Bazzarella et al. | |
| 9,437,864 B2 | 9/2016 | Tan et al. | |
| 9,484,569 B2 | 11/2016 | Doherty et al. | |
| 9,583,780 B2 | 2/2017 | Chiang et al. | |
| 9,614,231 B2 | 4/2017 | Carter et al. | |
| 9,786,944 B2 | 10/2017 | Chiang et al. | |
| 9,812,674 B2 | 11/2017 | Bazzarella et al. | |
| 9,825,280 B2 | 11/2017 | Chiang et al. | |
| 9,831,518 B2 | 11/2017 | Chiang et al. | |
| 9,831,519 B2 | 11/2017 | Chiang et al. | |
| 9,831,522 B2 | 11/2017 | Tan et al. | |
| 10,115,970 B2 | 10/2018 | Ota et al. | |
| 10,122,044 B2 | 11/2018 | Tan et al. | |
| 10,153,651 B2 | 12/2018 | Taylor et al. | |
| 10,181,587 B2 | 1/2019 | Ota et al. | |
| 10,230,128 B2 | 3/2019 | Chiang et al. | |
| 10,236,518 B2 | 3/2019 | Chiang et al. | |
| 10,411,310 B2 | 9/2019 | Chiang et al. | |
| 10,483,582 B2 | 11/2019 | Chiang et al. | |
| 10,497,935 B2 | 12/2019 | Ota et al. | |
| 10,522,870 B2 | 12/2019 | Tan et al. | |
| 10,566,581 B2 | 2/2020 | Bazzarella et al. | |
| 10,566,603 B2 | 2/2020 | Slocum et al. | |
| 10,593,952 B2 | 3/2020 | Ota et al. | |
| 10,601,239 B2 | 3/2020 | Taylor et al. | |
| 10,637,038 B2 | 4/2020 | Zagars et al. | |
| 10,734,672 B2 | 8/2020 | Chen et al. | |

(56) References Cited

U.S. PATENT DOCUMENTS

| | | |
|---|---|---|
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 * | 5/2021 | Ota .................. H01G 11/86 |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,342,567 B2 | 5/2022 | Chiang et al. |
| 11,394,049 B2 | 7/2022 | Tan et al. |
| 11,575,146 B2 | 2/2023 | Taylor et al. |
| 11,611,061 B2 | 3/2023 | Zagars et al. |
| 11,646,437 B2 | 5/2023 | Bazzarella et al. |
| 2001/0028977 A1 | 10/2001 | Kazacos et al. |
| 2001/0055713 A1 | 12/2001 | Eidler et al. |
| 2002/0074972 A1 | 6/2002 | Narang et al. |
| 2003/0022059 A1 | 1/2003 | Ito et al. |
| 2003/0039868 A1 | 2/2003 | Liberatore et al. |
| 2003/0091883 A1 | 5/2003 | Peled et al. |
| 2003/0113627 A1 | 6/2003 | Choi et al. |
| 2003/0143456 A1 | 7/2003 | Kazacos et al. |
| 2003/0211377 A1 | 11/2003 | Holmes et al. |
| 2004/0130061 A1 | 7/2004 | Lavoie et al. |
| 2004/0191623 A1 | 9/2004 | Kubata et al. |
| 2004/0209153 A1 | 10/2004 | Peled et al. |
| 2004/0234843 A1 | 11/2004 | Skyllas-Kazacos |
| 2004/0241552 A1 | 12/2004 | Skyllas-Kazacos |
| 2005/0175890 A1 | 8/2005 | Tsutsumi et al. |
| 2005/0244707 A1 | 11/2005 | Skyllas-Kazacos et al. |
| 2006/0032046 A1 | 2/2006 | Nathan et al. |
| 2006/0063065 A1 | 3/2006 | Clarke et al. |
| 2006/0183016 A1 | 8/2006 | Kozacos et al. |
| 2006/0204810 A1 | 9/2006 | Surampudi et al. |
| 2008/0094937 A1 | 4/2008 | Li et al. |
| 2008/0131357 A1 | 6/2008 | Kumar et al. |
| 2008/0192564 A1 | 8/2008 | Jouvin |
| 2008/0241629 A1 | 10/2008 | Peled et al. |
| 2008/0292964 A1 | 11/2008 | Kazacos et al. |
| 2009/0017379 A1 | 1/2009 | Inatomi et al. |
| 2009/0032754 A1 | 2/2009 | Pechtold |
| 2009/0253025 A1 | 10/2009 | Whitacre, Jr. |
| 2010/0003545 A1 | 1/2010 | Horne et al. |
| 2010/0047671 A1 | 2/2010 | Chiang et al. |
| 2010/0248046 A1 | 9/2010 | Kimura et al. |
| 2010/0323264 A1 | 12/2010 | Chiang et al. |
| 2011/0159345 A1 | 6/2011 | Makidera et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0088155 A1 | 4/2012 | Yushin et al. |
| 2012/0135278 A1 | 5/2012 | Yoshie et al. |
| 2012/0135282 A1 | 5/2012 | La Mantia et al. |
| 2012/0164499 A1 | 6/2012 | Chiang et al. |
| 2012/0328917 A1 | 12/2012 | Sakashita et al. |
| 2013/0040229 A1 | 2/2013 | Grigorian et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030605 A1 | 1/2014 | Kim et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 * | 1/2015 | Tan .................. H01M 10/058 429/233 |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0287980 A1 | 10/2015 | Chen et al. |
| 2015/0295272 A1 | 10/2015 | Chiang et al. |
| 2015/0357626 A1 * | 12/2015 | Holman .................. H01M 4/36 264/49 |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 * | 5/2016 | Zagars .............. H01M 10/0585 429/162 |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 * | 10/2016 | Ota .................. H01M 4/661 |
| 2016/0308243 A1 | 10/2016 | Herle et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2021/0249678 A1 | 8/2021 | Chiang et al. |
| 2021/0384516 A1 | 12/2021 | Michael et al. |
| 2022/0085440 A1 | 3/2022 | Ota et al. |
| 2022/0173446 A1 | 6/2022 | Chiang et al. |
| 2022/0285669 A1 | 9/2022 | Doherty et al. |

FOREIGN PATENT DOCUMENTS

| | | | |
|---|---|---|---|
| CN | 102119461 | 7/2011 | |
| DE | 102004033345 | 2/2006 | |
| EP | 0330290 | 5/1996 | |
| GB | 2346006 A | 7/2000 | |
| GB | 2374722 A | 10/2002 | |
| JP | H1145706 A | 2/1999 | |
| JP | 2001236991 A | 8/2001 | |
| JP | 2006156255 A | 6/2006 | |
| JP | 2006-294288 A | 10/2006 | |
| JP | 2008-270137 A | 11/2008 | |
| JP | 2008-544444 | 12/2008 | |
| JP | 2010-157361 | 7/2010 | |
| JP | 2011-076824 | 4/2011 | |
| JP | 2011-524074 | 8/2011 | |
| KR | 20150122124 A * | 10/2015 | ........ H01M 10/0585 |
| WO | WO 95/19052 | 7/1995 | |
| WO | WO 97/24774 | 7/1997 | |

(56) References Cited

FOREIGN PATENT DOCUMENTS

| WO | WO 1998/05706 A1 | 2/1998 |
|---|---|---|
| WO | WO 99/65100 | 12/1999 |
| WO | WO 2006/129635 | 12/2006 |
| WO | WO 2006/135958 | 12/2006 |
| WO | WO 2008/128341 | 10/2008 |
| WO | WO 2008/148148 | 12/2008 |
| WO | WO 2009/151639 | 12/2009 |
| WO | WO 2010/143634 | 12/2010 |
| WO | WO 2011/084649 | 7/2011 |
| WO | WO 2011/127384 | 10/2011 |
| WO | WO 2012/024499 | 2/2012 |
| WO | WO 2012/088442 | 6/2012 |
| WO | WO-2013036802 A1 | 3/2013 |

OTHER PUBLICATIONS

Office Action for Canadian Application No. 2,876,416, dated Apr. 14, 2020, 6 pages.
Notification of the First Office Action for Chinese Application No. 201380039146.0, dated Jun. 2, 2016, 10 pages.
Notification of the Second Office Action for Chinese Application No. 201380039146.0, dated Mar. 28, 2017, 7 pages.
Notification of the Third Office Action for Chinese Application No. 201380039146.0, dated Nov. 16, 2017, 5 pages.
Extended European Search Report for European Application No. 13803965.6, dated Dec. 22, 2015, 8 pages.
Examination Report for European Application No. 13803956.6, dated May 19, 2021, 5 pages.
Office Action for European Application No. 13803965.6, dated Mar. 17, 2020, 4 pages.
Notice of Reasons for Rejection for Japanese Application No. 2015-517328, dated Jun. 8, 2017, 5 pages.
Notice of Reasons for Rejection for Japanese Application No. 2015-517328, dated May 7, 2019, 29 pages.
Notice of Reasons for Rejection for Japanese Application No. 2015-517328, dated Dec. 20, 2019, 9 pages.
Office Action for U.S. Appl. No. 13/832,861, dated Mar. 2, 2015, 9 pages.
Office Action for U.S. Appl. No. 13/832,861, dated Dec. 3, 2015, 8 pages.
International Search Report and Written Opinion for International Application No. PCT/US2013/044915, dated Oct. 31, 2013.
Notice of Reasons for Rejection for Japanese Application No. 2018-120482, dated Jul. 18, 2019, 9 pages.
Notice of Reasons for Rejection for Japanese Application No. 2018-120482, dated Jan. 17, 2020, 4 pages.
Office Action for U.S. Appl. No. 15/266,054, dated Oct. 19, 2017, 9 pages.
Office Action for U.S. Appl. No. 15/266,054, dated Jun. 1, 2018, 8 pages.
Office Action for U.S. Appl. No. 15/266,054, dated Jun. 11, 2019, 9 pages.
Office Action for U.S. Appl. No. 15/266,054, dated Mar. 16, 2020, 9 pages.
Office Action for U.S. Appl. No. 15/266,054, dated Apr. 5, 2021, 11 pages.
Office Action for U.S. Appl. No. 15/266,054, dated Jan. 25, 2022, 13 pages.
Office Action for U.S. Appl. No. 13/872,613, dated Aug. 26, 2013, 13 pages.
Office Action for Japanese Application No. 2020-141311, dated Sep. 7, 2021, 5 pages.
International Search Report and Written Opinion for International Application No. PCT/US2010/030136, dated Jul. 20, 2010, 8 pages.
Office Action for U.S. Appl. No. 12/970,773, dated Jun. 13, 2013, 6 pages.
International Search Report and Written Opinion for International Application No. PCT/US2011/065615, dated Apr. 23, 2012, 8 pages.

Office Action for U.S. Appl. No. 15/407,669, dated Jun. 28, 2019, 12 pages.
Office Action for U.S. Appl. No. 15/407,669, dated Jan. 27, 2020, 14 pages.
Office Action for U.S. Appl. No. 15/407,669, dated Jun. 29, 2020, 12 pages.
Office Action for U.S. Appl. No. 15/407,669, dated Dec. 16, 2020, 5 pages.
International Search Report and Written Opinion for International Application No. PCT/US2017/013774, dated Mar. 24, 2017, 7 pages.
Office Action for Chinese Application No. 200980127051.8, dated Aug. 14, 2013, 11 pages.
Office Action for Chinese Application No. 200980127051.8, dated Dec. 26, 2012, 16 pages.
Office Action for European Application No. 09762935.6, dated Sep. 27, 2011, 4 pages.
Office Action for Japanese Application No. 2011-513506, dated Jul. 29, 2013, 3 pages.
International Search Report and Written Opinion for International Application No. PCT/US2009/003551, dated Sep. 21, 2009, 16 pages.
International Preliminary Report on Patentability for International Application No. PCT/US2009/003551, dated Dec. 23, 2010, 11 pages.
International Search Report and Written Opinion for International Application No. PCT/US2010/060876, dated May 23, 2011, 9 pages.
International Preliminary Report on Patentability for International Application No. PCT/US2010/060876, dated Jun. 28, 2012, 7 pages.
International Search Report and Written Opinion for International Application No. PCT/US2011/031748, dated Aug. 24, 2011, 8 pages.
International Preliminary Report on Patentability for International Application No. PCT/US2011/031748, dated Oct. 18, 2012, 6 pages.
International Search Report and Written Opinion for International Application No. PCT/US2011/048266, dated Nov. 23, 2011, 11 pages.
International Preliminary Report on Patentability for International Application No. PCT/US2011/048266, dated Feb. 28, 2013, 9 pages.
Amatucci, G. G. et al., "Fluoride based electrode materials for advanced energy storage devices," Journal of Fluorine Chemistry, 128(4):243-262 (2007).
Amatucci, G. G., "Battery Materials and Issues for Grid Applications," Rutgers, Department of Material Science and Engineering, Stanford University Global Climate & Energy Project, Nov. 2, 2007, http://gcep.stanford.edu/pdfs/iq9b0/11bOrRuH/veOA2jA/Amatucci-20071102, 33 pages.
Armand, M. et al., "Conjugated dicarboxylate anodes for Li-ion batteries," Nature Materials, 8:120-125 (2009).
Asgeirsson, H., "Zinc Bromine Flow Battery at Detroit Edison Utility Application," California Energy Commission Workshop, Feb. 24, 2005, DTE Energy, 35 pages.
Badway, F. et al., "Carbon-Metal Fluoride Nanocomposites," Journal of the Electrochemical Society, 150(9):A1209-A1218 (2003).
Badway, F. et al., "Carbon-Metal Fluoride Nanocomposites: High-Capacity Reversible Metal Fluoride Conversion Materials as Rechargeable Positive Electrodes for Li Batteries," Journal of the Electrochemical Society, 150(10):A1318-A1327 (2003).
Badway, F. et al., "Structure and Electrochemistry of Copper Fluoride Nanocomposites Utilizing Mixed Conducting Matrices," Chem. Mater., 19:4129-4141 (2007).
Bae, C.-H. et al., "Chromium redox couples for application to redox flow batteries," Electrochimica Acta, 48:279-287 (2002).
Bartolozzi, M., "Development of Redox Flow Batteries. A Historical Bibliography," Journal of Power Sources, 27:219-234 (1989).
Bazylak, A. et al., "Improved fuel utilization in microfluidic fuel cells. A computational study," Journal of Power Sources, 143:57-66 (2005).

(56) References Cited

OTHER PUBLICATIONS

Bervas, M. et al., "Bismuth Fluoride Nanocomposite as a Positive Electrode Material for Rechargeable Lithium Batteries," Electrochemical and Solid-State Letters, 8(4):A179-A183 (2005).
Bervas, M. et al., "Investigation of the Lithiation and Delithiation Conversion Mechanisms in a Bismuth Fluoride Nanocomposites," Journal of the Electrochemical Society, 153(4):A799-A808 (2006).
Bervas, M. et al., "Reversible Conversion Reactions with Lithium in Bismuth Oxyfluoride Nanocomposites," Journal of the Electrochemical Society, 153(1):A159-A170 (2006).
Santos, H. M. et al., Chapter 1: The Power of Ultrasound In: Ultrasound in Chemistry: Analytical Applications, Capelo-Martinez, J-L (Ed.), Wiley-VCH Verlag Gmbh & Co. KGaA, Weinhelm, pp. 1-16 (2009).
Cellennium (Thailand) Company Limited, Technology, "Basic Principle of the Vandium Fuel Cell," http://www.vandiumbattery.com/technology.asp, Retrieved from the Internet: Apr. 12, 2009, 2 pages.
Chakrabarti, M. H., "Evaluation of electrolytes for redox flow battery applications," Electrochemica Acta, 52:2189-2195 (2007).
Chan, C. K. et al., "High-performance lithium battery anodes using silicon nanowires," Nature Nanotechnology, 3:31-35 (2008).
Chen, Y-W D. et al., "Solution Redox Couples for Electrochemical Energy Storage," J. Electrochem. Soc., 128(7):1460-1467 (1981).
Chen, Y.-H. et al.,"Porous cathode optimization for lithium cells: Ionic and electronic conductivity, capacity, and selection of materials," Journal of Power Sources, 195 (2010) pp. 2851-2862, Published online: Nov. 13, 2009.
Cosandey, F. et al., "EELS Spectroscopy of Iron Fluorides and $FeF_x$/C Nanocomposite Electrodes Used in Li-Ion Batteries," Microscopy and Microanalysis, 13(2):87-95 (2007).
Davidson, P., "New battery packs powerful punch," USA Today, Jul. 4, 2007, 3 pages.
De Boer, P. et al., "Briefing Paper: Flow Batteries," KEMA, Jun. 2007, Leonardo Energy, 9 pages.
De Leon, C. P. et al., "Redox Flow Cells for Energy Conversion," Journal of Power Sources, 160:716-732 (2006).
Department of Energy Tutorial, "II. Energy Storage Technology Overview," http://www.netl.doe.gov/technolgies/coalpower/fuelcells/seca/tutoriai/Tutorialll/files/Tutorialll, Courtesy: Energy Storage Association (ESA), 61 pages.
DTI, Regenesys Utility Scale Energy Storage, Project Summary, Contract No. K/EL/00246/00/00, URN No. 04/1048, (2004), 20 pages.
Duduta, M. et al., "Semi-Solid Lithium Rechargeable Flow Battery," Advanced Energy Materials. 1(4):511-516 (2011).
Endo, A. et al., "Electrochemistry of Tris(β-diketonato)ruthenium(III) Complexes at Platinum Electrodes in Nonaqueous Solutions and Substituent Effects on their Rreversible Half-Wave Potentials," Bulletin of the Chemical Society of Japan, 62(3): 709-716 (1989).
Erol, M. et al., "Assessment of the Degree of Mixedness of Filled Polymers," Intern. Polymer Processing XX, 3:228-237 (2005).
"Flow Cell Battery Recharges Power Grid," Advanced Battery Technology, Apr. 2003, http://findarticles.com/p/articles/mi/qa3864/is/200304/ai/n9167647/.pdf, 4 pages.
EscoVale Consultancy Services, "Flow/Redox Batteries: Technologies, Applications and Markets," The New Management Report #5061, No date given, 8 pages.
Garrard, A. et al., "Numerical model of a single phase, regenerative fuel cell," Fuel Cell Science, Engineering and Technology, The Second International Conference on Fuel Cell Science, Jun. 14-16, 2004, Rochester, NY, The American Society of Mechanical Engineers, The Rochester Institute of Technology, p. 79-84.
Giridharan, M. G. et al., "Computational simulation of microfluidics, electrokinetics, and particle transport in biological mems devices," In Proceedings of SPIE, Part of the Symposium on Design, Test, and Microfabrication of MEMS and MOEMS, Paris, France, Mar.-Apr. 1999, pp. 150-160.
"High System-Power Density Flow Battery for Advanced Modular, Energy Storage Technology," Navy SBIR FY2009.1, Proposal No. N091-053-0414, http://www.navysbir.com/09_1/179.htm, Retrieved from the Internet: Apr. 12, 2009, 2 pages.
Hong, C-C et al., "A novel in-plane passive microfluidic mixer with modified Tesla structures," The Royal Society of Chemistry Lab Chip, 4:109-113 (2004).
Johnson, T. J. et al., "Characterization and optimization of slanted well designs for microfluidic mixing under electroosmotic flow," The Royal Society of Chemistry Lab Chip, 2(3):135-140 (2002).
Jossen, A. et al., "Advances in redox-flow batteries," First International Renewable Energy Storage Conference, Gelsenkirchen, Germany, Oct. 30-31, 2006, 23 pages.
Katz, E. et al., "Chapter 21: Biochemical Fuel Cells," in Handbook of Fuel Cells—Fundamentals, Technology and Applications, vol. 1: Fundamentals and Survey of Systems, Vielstich et al. (eds.) John Wiley & Sons (2003), 27 pages.
Koo, J. et al., "Liquid flow in microchannels: experimental observations and computational analyses of microfluidics effects," Journal of Micromechanics and Microengineering, 13(5):568-579 (2003).
Kumar, A. et al., "Effect of channel dimensions and shape in the flow-field distributor on the performance of polymer electrolyte membrane fuel cells," Journal of Power Sources, 113:11-18 (2003).
Kuntz, M. T., "Flow battery storage application with wind power," California Energy Commission Staff, Workshop: Meeting California's electricity system challenges through electricity energy storage, Feb. 24, 2005, VRB Power Systems Inc., 15 pages.
Lee, Y. J. et al., "Fabricating Genetically Engineered High-Power Lithium-Ion Batteries Using Multiple Virus Genes," Science, 324:1051-1055 (2009).
Li, H. et al., "Li-Storage via Heterogeneous Reaction in Selected Binary Metal Fluorides and Oxides," Journal of Electrochemical Society, 151(11):A1878-A1885 (2004).
Li, W. et al., "Rechargeable Lithium Batteries with Aqueous Electrolytes," Science, 264:1115-1118 (1994).
Lithium, U.S. Geological Survey, Mineral Commodity Summaries, Jan. 2010, p. 93.
Medeiros, M. G. et al., "Magnesium-Solution Phase Catholyte Semi-Fuel Cell for Undersea Vehicles," Selected papers presented at the International Power Sources Symposium, Journal of Power Sources, 136(2):226-231 (2004) Abstract.
Miley, G. H. et al., "Optimization of the $H_2O_2$—$NaBH_4$ Regenerative Fuel Cell for Space Power Applications Using FEMLAB Modeling," Excerpt from the Proceedings of the COMSOL Multiphysics User's Conference, Boston (2005), http://cds.comsol.com/access/dl/papers/1090/Miley.pdf, 6 pages.
Molenda, J. et al., "Modification in the electronic structure of cobalt bronze $Li_xCoO_2$ and the resulting electrochemical properties," Solid State Ionics, 36:53-58 (1989).
Morikawa, H. et al., "Development and Advances of a V -Flow FC Stack for FCX Clarity," SAE Int. J. Engines, 2(1):955-959 (2009).
Nakahara, K. et al. "Rechargeable batteries with organic radical cathodes," Chemical Physics Letters, 359:351-354 (2002).
Nam, K. T. et al., "Virus-enabled synthesis and assembly of nanowires for lithium ion battery electrodes," Science, 312(5775):885-888 (2006).
Nishide, H. et al., "Organic radical battery: nitroxide polymers as a cathode-active material," Electrochimica Acta, 50:827-831 (2004).
Officer, C., "Better rechargable batteries," Anzode (NZ) Ltd., Anzode Clean Energy Solutions, 2009, 13 pages.
Peek, G., "Evaluation of utility scale system," TVA Regenesys Flow Battery Demonstration, Sandia National Laboratories, Oct. 30, 2003, 18 pages.
Pereira, N. et al., "Iron Oxyfluorides as High Capacity Cathode Materials for Lithium Batteries," Journal of the Electrochemical Society, 156(6):A407-A416 (2009).
Pillai, K. C. et al., "Studies on Promising Cell Performance with $H_2SO_4$ as the Catholyte for Electrogeneration of $AG^{2+}$ from $AG^+$ in $HNO_3$ Anolyte in Mediated Electrochemical Oxidation Process," J. Appl. Electrochem, 39:23-30 (2009).
Plitz, I. et al., "Structure and Electrochemistry of Carbon-Metal Fluoride Nanocomposites Fabricated by a Solid State Redox Conversion Reaction", Journal of the Electrochemical Society, 152(2):A307-A315 (2005).

(56) References Cited

OTHER PUBLICATIONS

Plurion Technology Platform, Flow Batteries Vs. Conventional Batteries, Plurion Advantages Webpage, web.archive.org/web/20100623000411/http://plurionsystems.com/tech_flow_advantages.html, Retrieved from the Internet: Jun. 23, 2010, 2 pages.

Plurion Technology Platform, Flow Batteries Vs. Conventional Batteries, Plurion Advantages Webpage, web.archive.org/web/20080514160556/http://plurionsystems.com/tech_flow_advantages.html, Retrieved from the Internet: May 14, 2008, 2 pages.

Ponce De Leon, C. et al., "Redox flow batteries for energy conversion," Journal of Power Sources, 160(1):716-732 (2006).

Price, A. et al., "The Regenesys Utility-Scale Flow Battery Technology: Flow Battery Technologies for Electrical Energy Storage," VDI Berichte Nr., 1734:47-56 (2002).

Ruffo, R. et al., "Electrochemical behavior of $LiCoO_2$ as aqueous lithium-ion battery electrodes," Electrochemistry Communications, 11:247-249 (2009).

Rydh, C. J. et al., "Energy analysis of batteries in photovoltaic systems," EESAT, San Francisco, CA, Oct. 27-29, 2003, 6 pages.

Rydh, C. J. et al., "Energy analysis of batteries in photovoltaic systems. Part 1: Performance and energy requirements," Energy Conversion and Management, 46:1957-1979 (2005).

Rydh, C. J. et al., "Energy analysis of batteries in photovoltaic systems. Part II: Energy return factors and overall battery efficiencies," Energy Conversion and Management, 46:1980-2000 (2005).

Skyllas-Kazacos, M., "Efficient Vanadium Redox Flow Cell," Journal of the Electrochemical Society, 134(12):2950-2953 (1987).

Thaller, L. H., "Cleantech Energy Storage Blog: Redox Flow Batteries . . . Then and Now (Part 1)," posted Sep. 4, 2008, http://www.deeyaenergy.com/blog/bid/5225/Redox-Flow-Batteries-Then-And-Now-Part-1, accessed Apr. 12, 2009, 4 pages.

Thomas, M. H., "Persistence and progress: The zinc bromine battery," ZBB Energy Corporation, No date given, 27 pages.

Todd, "Mixing of Highly Viscous Fluids, Polymers, and Pastes", 2004, John C. Wiley & Sons, Handbook of Industrial Mixing: Science and Practice, pp. 987-1025, (Year: 2004).

Tour Best Europe Limited, Wetting Agents, [Online], Retrieved from the Internet: <URL: http://www.tourbest.eu/wetting-agents/>, 2015, 2 pages.

VRB Power Systems Inc., News Release, "USF and Progress Energy Florida Purchase Two 5kW x 4hr VRB Energy Storage Systems," Jul. 25, 2007, 2 pages.

Walsh, F. C., "Electrochemical technology for environmental treatment and clean energy conversion," Pure Appl. Chem., 73(12):1819-1837 (2001).

Wang, H. et al., "Optimizing layout of obstacles for enhanced mixing in microchannels," Smart Materials and Structures, 11(5):662-667 (2002).

Wen, Y. H. et al., "A study of the Fe(III)/Fe(II)-triethanolamine complex redox couple for redox flow battery application," Electrochimica Acta, 51:3769-3775 (2006).

Yamamura, T. et. al., "Enhancements in the electron transfer kinetics of uranium-based redox couples induced by tetraketone ligands with potential chelate effect," Journal of Physical Chemistry, 111:18812-18820 (2007).

Yu, D. Y. W. et al., "Effect of electrode parameters on $LiFePO_4$ cathodes," Journal of the Electrochemical Society, 153(5):A835-A839 (2006).

ZBB Energy Corporation, "ZBB Energy aims for sales of up to US$38m in zinc bromine batteries form new Chinese joint venture," Media Release, Mar. 30, 2005, 2 pages.

ZBB Energy Corporation, "The ZBB is the best battery for renewable energy storage!," No date given, 42 pages.

Office Action for Japanese Application No. 2020-141311, dated Mar. 31, 2022, 5 pages.

Office Action for U.S. Appl. No. 15/266,054, dated Oct. 5, 2020, 11 pages.

Extended European Search Report for European Application No. EP20230185432 dated Dec. 22, 2023, 10 pages.

Office Action for Japanese Application No. JP2022151417 dated Nov. 14, 2023, 7 pages.

* cited by examiner

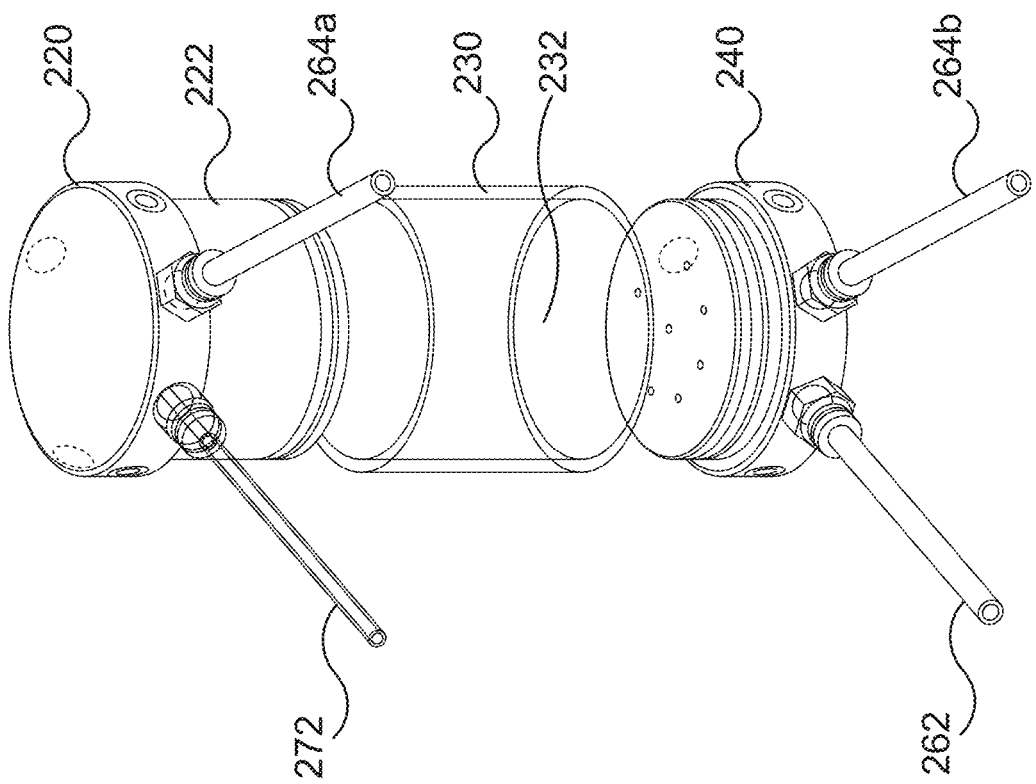
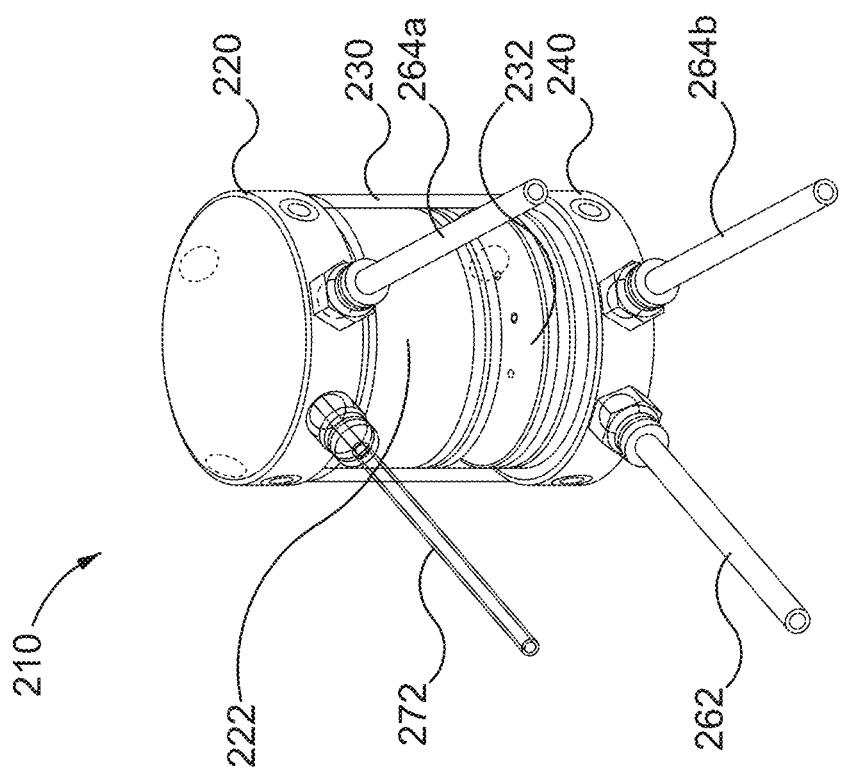

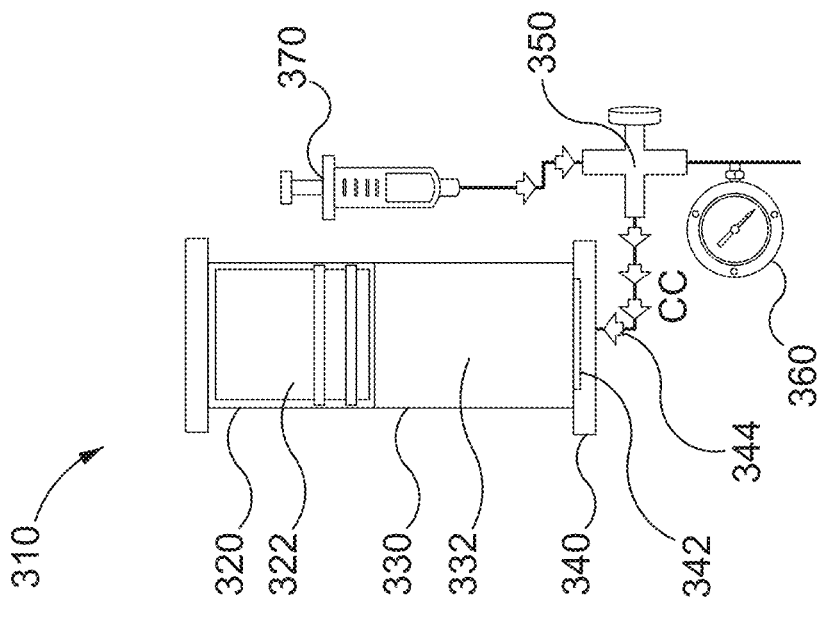
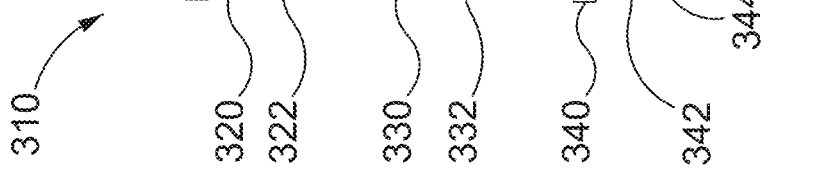
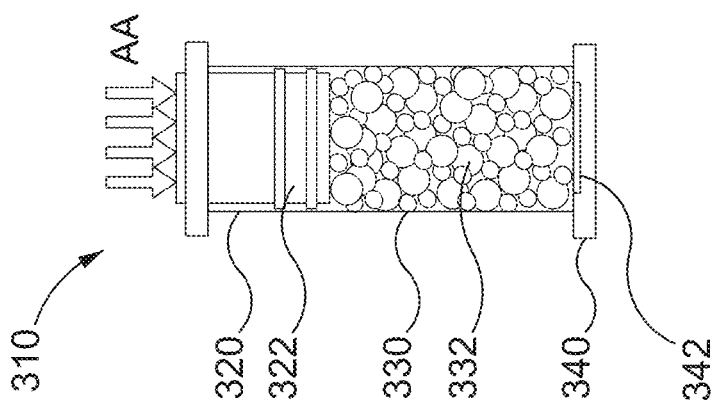

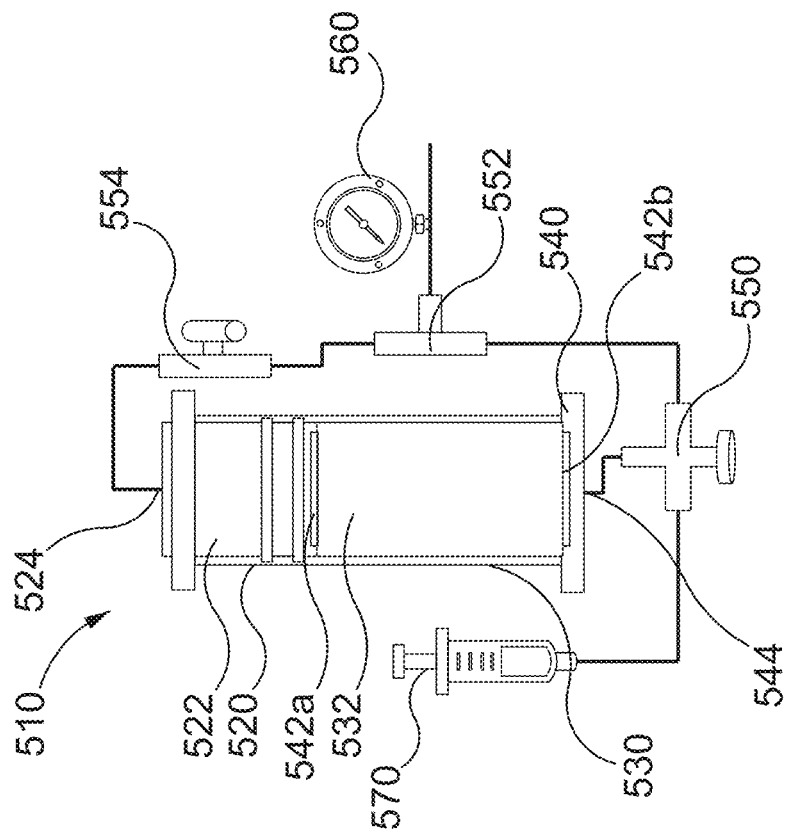
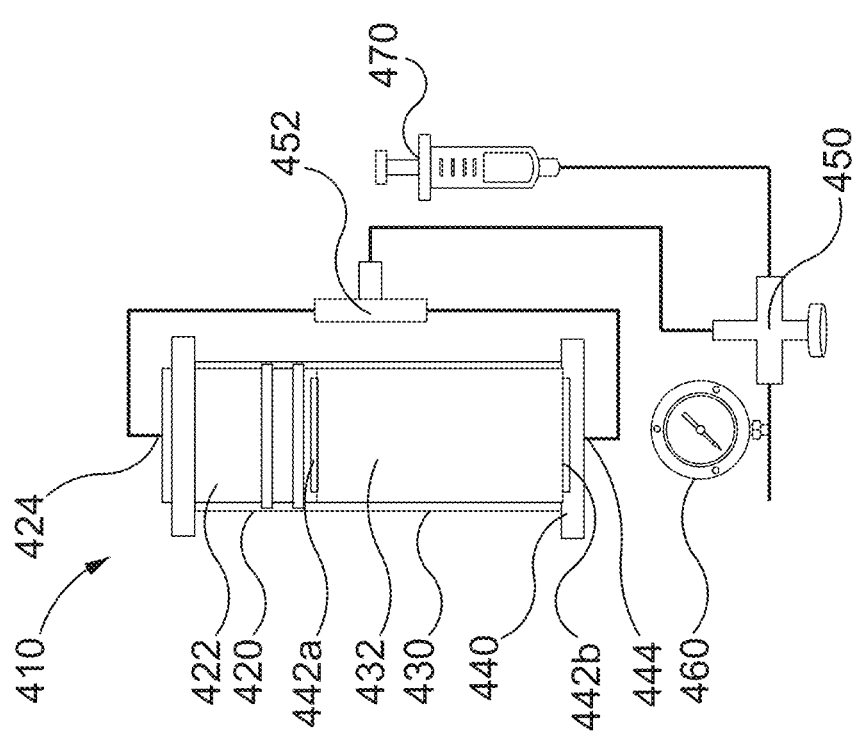

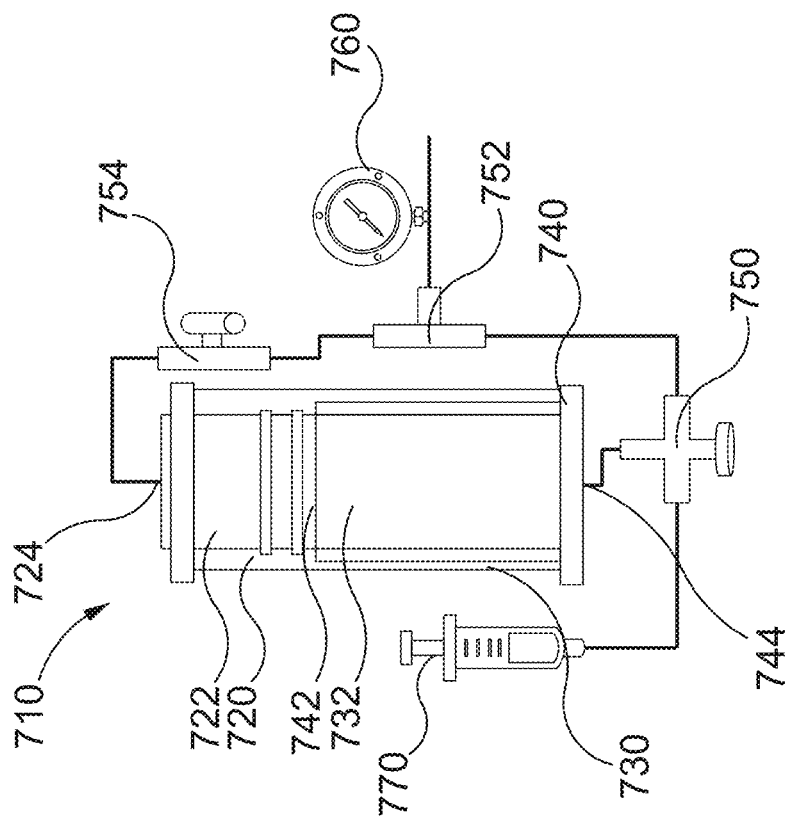
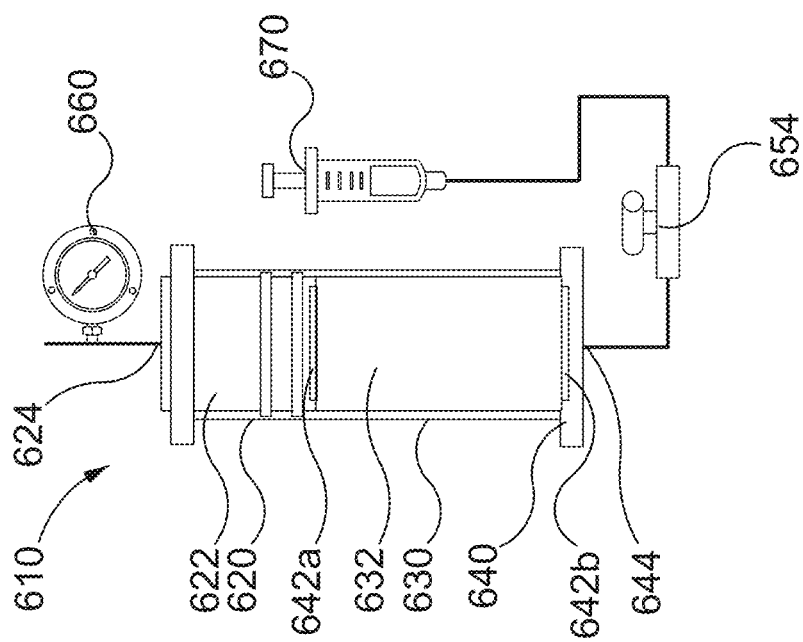

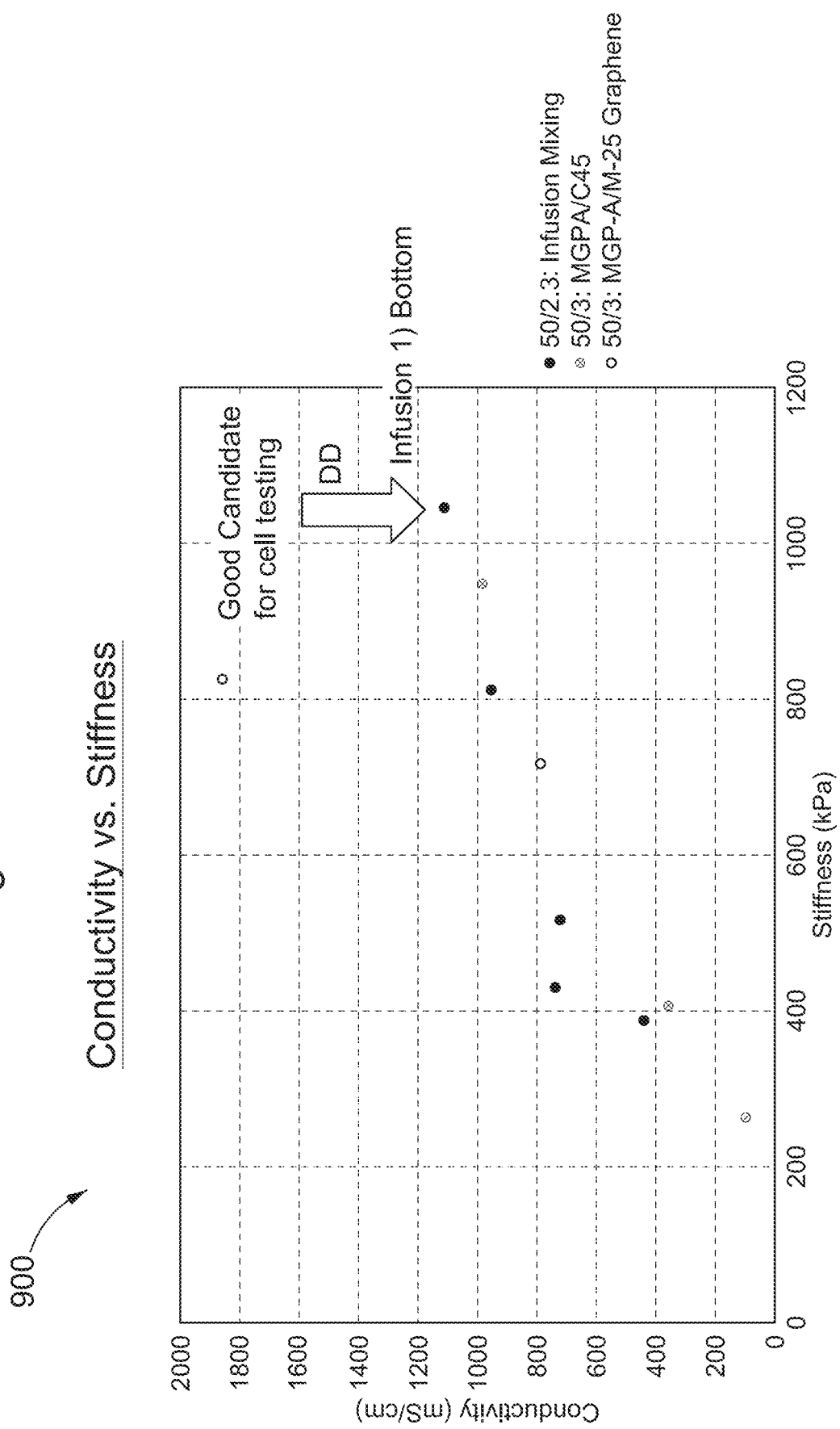

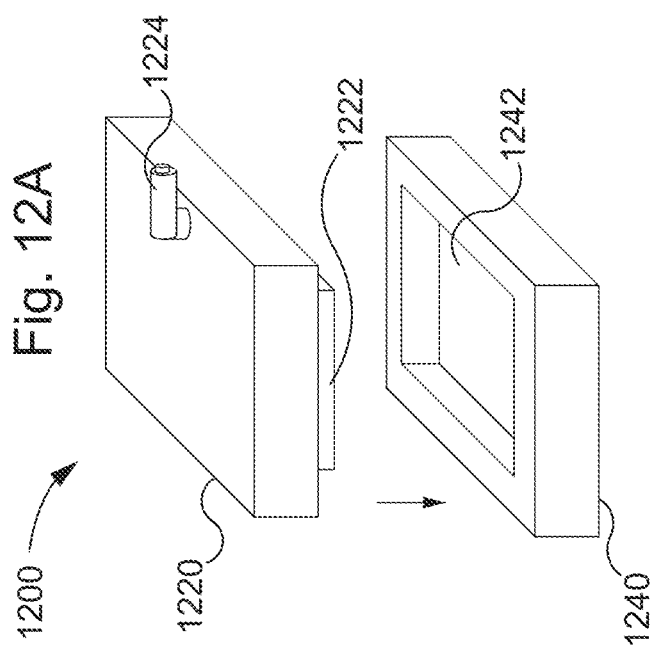
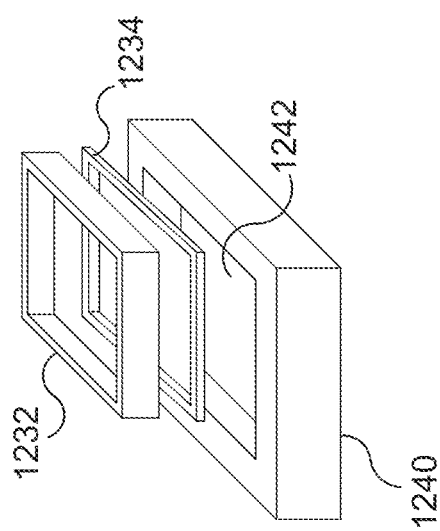
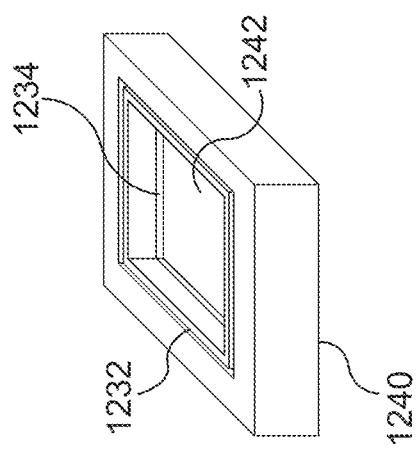
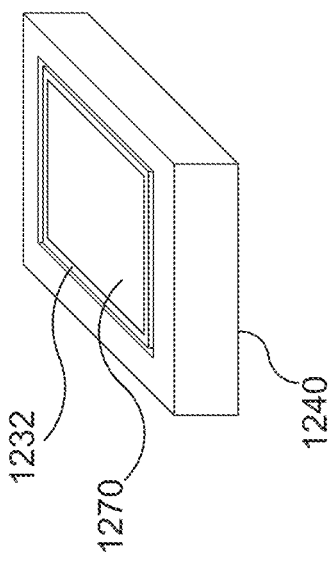
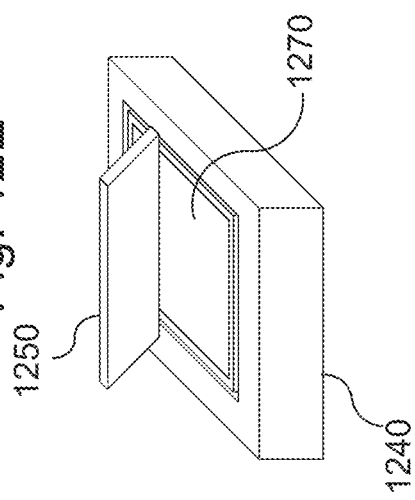

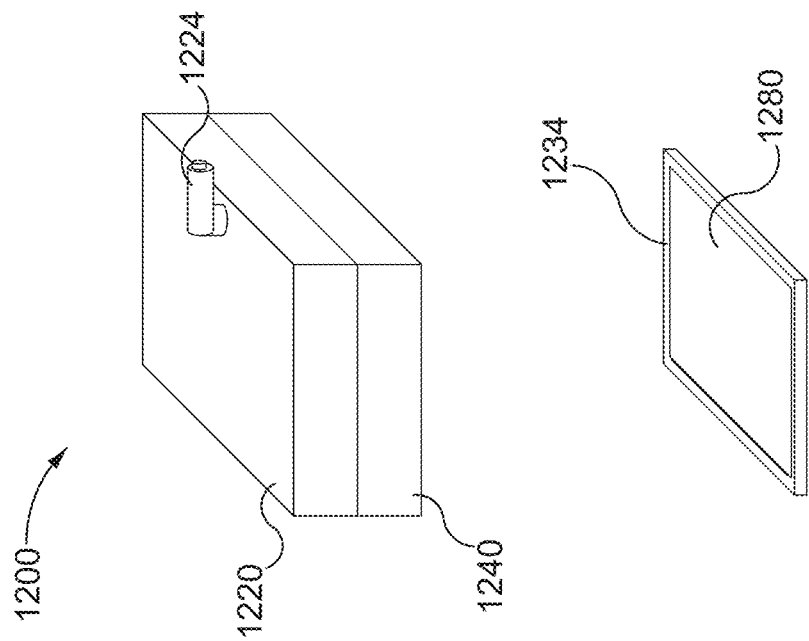
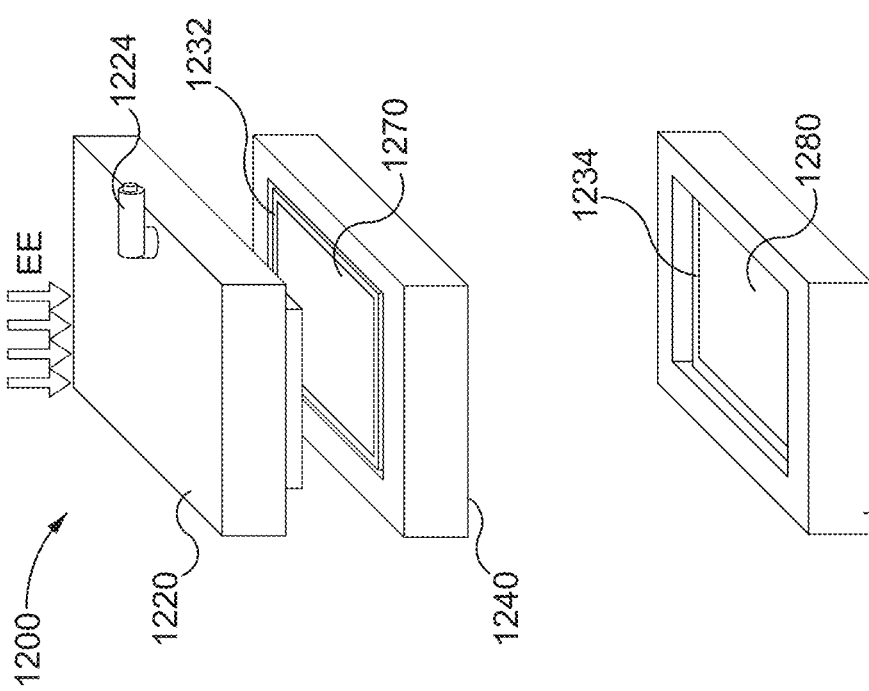

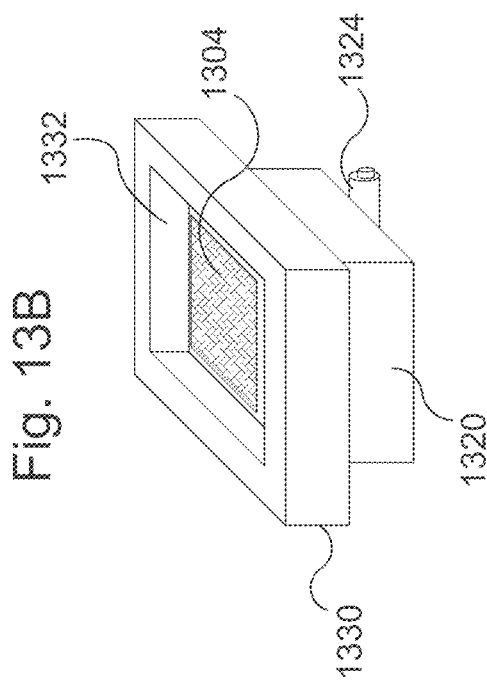
Fig. 13A
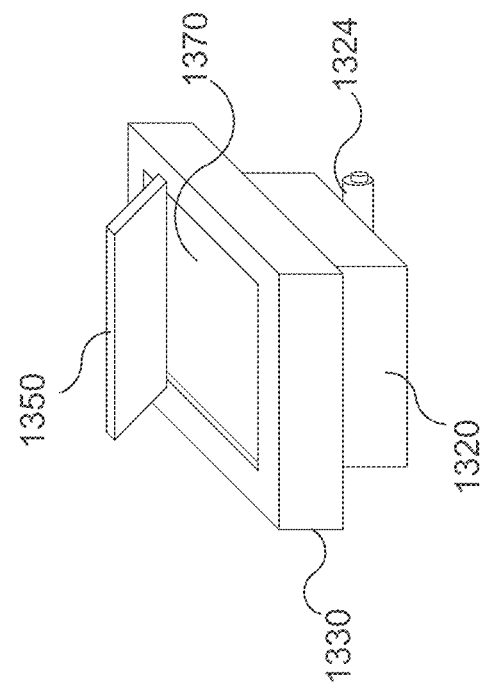
Fig. 13B
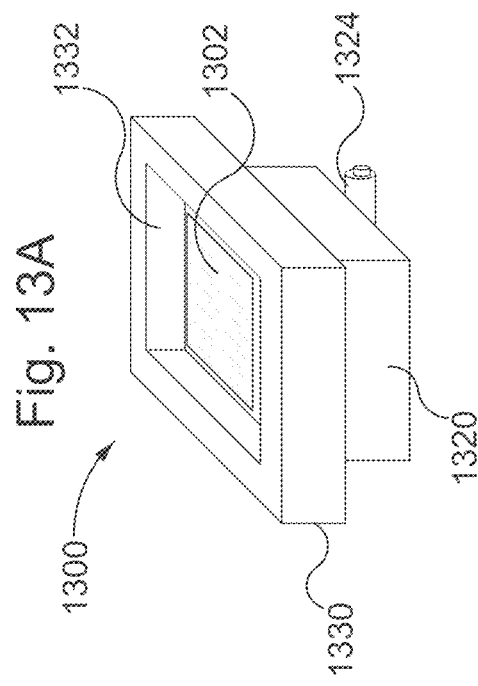
Fig. 13C
Fig. 13D

SYSTEMS AND METHODS FOR INFUSION MIXING A SLURRY-BASED ELECTRODE

CROSS-REFERENCE TO RELATED APPLICATIONS

This application is a continuation of U.S. patent application Ser. No. 15/407,669, entitled "Systems and Methods for Infusion Mixing a Slurry-Based Electrode," filed Jan. 17, 2017, which claims priority to and the benefit of U.S. Provisional Patent Application Ser. No. 62/279,281, entitled "Systems and Methods for Infusion Mixing a Slurry-Based Electrode," filed Jan. 15, 2016, the disclosures of which are hereby incorporated by reference in their entireties.

BACKGROUND

Electrochemical cells, including batteries based on lithium ion technology are ubiquitous in our everyday life. Batteries are typically constructed of solid electrodes, separators, electrolyte, and ancillary components such as, for example, packaging, thermal management, cell balancing, consolidation of electrical current carriers into terminals, and/or other such components. The electrodes typically include active materials, conductive materials, and other additives. Some known methods of manufacturing include coating a metallic substrate (e.g., a current collector) with slurry composed of an active material, a conductive additive, and a binding agent dissolved or dispersed in a solvent, evaporating the solvent, and calendering the dried solid matrix to a specified thickness. The electrodes are then cut, packaged with other components, infiltrated with electrolyte and the entire package is then sealed.

Current battery manufacturing methods generally involve complicated and expensive manufacturing steps in addition to the various components and steps mentioned above. For example, a manufacturing step, such as casting the electrode, produces electrodes with limited thicknesses, for example, less than 100 μm (final single sided coated thickness). Such limitations in electrode thickness inevitably lead to batteries with lower capacity, lower energy density, and a high ratio of inactive components to active materials. Therefore, there is a pressing need to develop an advanced manufacturing method—to simplify the manufacturing processes, increase production efficiency by streamlining and integrating certain manufacturing steps, while at the same time decreasing inactive components in the electrodes and finished batteries—that can potentially lead to batteries with increased energy density, charge capacity and overall performance.

SUMMARY

Embodiments described herein relate generally to a system, an apparatus and/or methods for manufacturing electrodes by infusion electrolyte into compacted electrode materials. In some embodiments, working electrode materials can be produced using an infusion mixing and manufacturing process. In some embodiments, a single-sided finished electrode can be produced directly from a dry powder mixture using an infusion mixing and manufacturing process. In some embodiments, a double-sided finished electrode can be produced directly from a dry powder mixture using an infusion mixing and manufacturing process. The electrodes produced by an infusion mixing and manufacturing process generally perform better than those produced by non-infusion processes.

BRIEF DESCRIPTION OF THE DRAWINGS

FIGS. 2A-2B show an assembled view and an exploded view, respectively, of an infusion apparatus, according to an embodiment.

FIGS. 3A-3C show the three stages of an infusion manufacturing process using three exemplary configurations of an infusion apparatus.

FIG. 4 shows an infusion apparatus, according to an embodiment.

FIG. 5 shows an infusion apparatus, according to an embodiment.

FIG. 6 shows an infusion apparatus, according to an embodiment.

FIG. 7 shows an infusion apparatus, according to an embodiment.

FIG. 9 shows a representative plot 900 of conductivity in working electrode materials versus stiffness in the working electrode materials.

FIGS. 12A-12I show an infusing manufacturing process that can be used to directly produce single-sided finished electrodes by incorporating in situ compression and infusion of electrolytes in a single processing apparatus.

DETAILED DESCRIPTION

Figure 1:
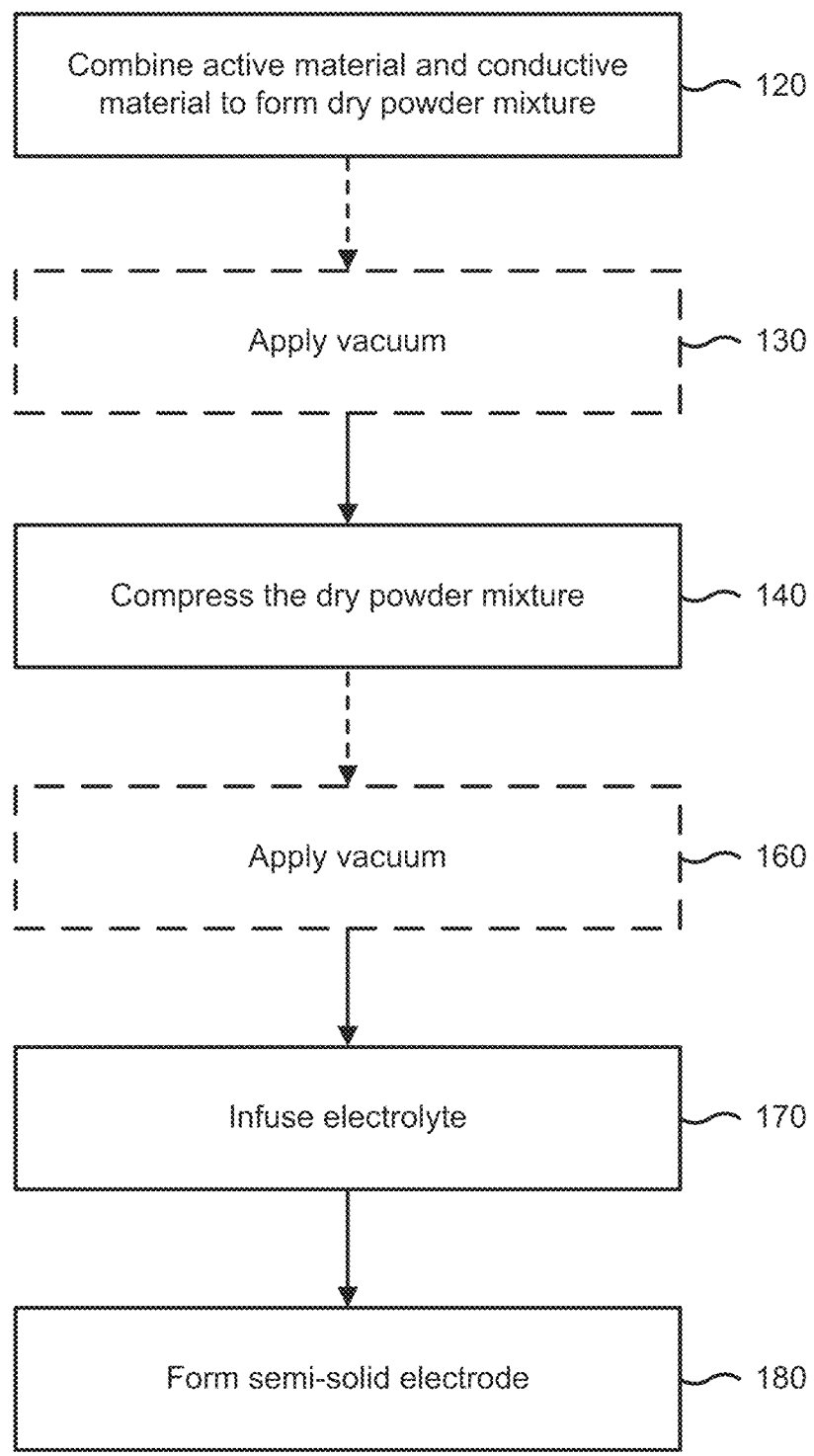
FIG. 1 shows a schematic flow diagram of an infusion manufacturing system for preparing a semi-solid electrode, according to an embodiment.

Embodiments described herein generally relate to systems and methods for preparing a semi-solid electrode or a conventional electrode. In some embodiments, a method of preparing a semi-solid electrode includes combining an active material with a conductive material to form an intermediate material (e.g., a dry powder mixture). The intermediate material is then compressed, and an electrolyte is infused into the compressed intermediate material to form a working semi-solid electrode material. The working semi-solid electrode material can then be formed into a semi-solid electrode. Optionally, the infusion of the electrolyte can be vacuum assisted. Said another way, a vacuum can be applied to the compressed intermediate material to evacuate air so that the liquid electrolyte can more easily flow into the compressed intermediate material.

In some embodiments, a vacuum can be applied to create a near vacuum in the chamber to facilitate the infusion of the electrolyte. The gradations of vacuum relate to the extent to which an enclosed chamber is devoid of matter, where gauge pressure relates to the inner-chamber pressure, atmospheric pressure relates to the pressure due to the atmosphere external to the enclosed chamber, and absolute pressure is the combined pressure from both inner-chamber pressure and the atmosphere external to the enclosed chamber. In some embodiments, the degree of vacuum in the chamber can be expressed in terms of gauge pressure in the chamber. In other words, the pressure in the chamber can be measured regardless of the conditions that exist in the atmosphere external to the chamber. In some embodiments, the degree of vacuum in the chamber can be characterized as a low vacuum. Low vacuum can be characterized as a gauge pressure of between 0.98 inches Hg and ~29.9213 inches Hg. In some embodiments, the degree of vacuum in the chamber can be characterized as a medium vacuum. Medium vacuum can be characterized as a gauge pressure of between 3.94E-05 inches Hg and 0.98 inches Hg. In some embodiments, the degree of vacuum in the chamber can be characterized as a high vacuum. High vacuum can be characterized as a gauge pressure of between 3.94E-11 inches Hg and 3.94E-05 inches Hg.

In some embodiments, the degree of vacuum in the chamber can be expressed in terms of pressure differential between the pressure exerted by the atmosphere external to the chamber and the pressure inside the chamber itself. In other words, in conditions for which the external atmospheric pressure is approximately 29.9213 inches Hg (i.e., 1 atm), the degree of vacuum can be expressed as a negative pressure differential with respect to the external environment. For example, in some embodiments, the pressure in the chamber can be less than about −25 inches Hg, less than about −26 inches Hg, less than about −27 inches Hg, less than about −28 inches Hg, or less than about −29 inches Hg.

In some embodiments, the degree of vacuum in the chamber can be expressed in terms of gauge pressure inside the chamber itself. For example, in some embodiments, the gauge pressure in the chamber can be less than about 5 inches Hg, less than about 4 inches Hg, less than about 2 inches Hg, less than about 1 inches Hg, or less than about 0.5 inches Hg.

In some embodiments, a wetting agent can be introduced into the compressed intermediate material prior to infusing the electrolyte. The wetting agent can be, for example, one or more gases (e.g., a mixture of gases) or one or more solvents (e.g., a mixture of solvents) that are formulated to aid in the wetting of the compressed intermediate material to facilitate the infusion of the electrolyte. The wetting agent can be introduced into the compressed intermediate material prior to infusing the electrolyte. In some embodiments, the air can be evacuated prior to introduction of the gas or the solvent to the compressed intermediate material. In some embodiments, the gas or the solvent can be used to displace the air from the compressed intermediate material.

Although the embodiments described herein may primarily illustrate the fundamental working principle of the infusion mixing technology for preparing binder-less electrode slurries (e.g., to produce semi-solid electrodes), the infusion mixing technology can generally be applied to preparing any conventional electrodes slurries (e.g., to produce conventional electrodes), independent of the active materials, the conductive materials, or whether binder materials are used.

In some embodiments, a method of preparing a conventional electrode from a conventional electrode slurry can begin by combining an active material, a conductive material, and a binder to form an intermediate material (e.g., a dry powder mixture). The intermediate material can then be compressed, and a solvent, such as N-methyl-2-pyrrolidone (NMP), can be infused into the compressed intermediate material to form a working electrode slurry. The electrode slurry can then be formed into a conventional electrode. Optionally, the infusion of the solvent can be vacuum assisted so that the solvent can more easily flow into the compressed intermediate material. The solvent can then be evaporated, and the electrode can be infused with an electrolyte.

Typical battery manufacturing involves numerous complex and costly processes carried out in series, each of which is subject to yield losses, incurs capital costs for equipment, and includes operating expenses for energy consumption and consumable materials. The process first involves preparing separate anodic and cathodic mixtures (also referred to as "slurries") that are typically mixtures of electrochemically active ion storage compounds, electrically conductive additives, and polymer binders. The mixtures are then coated onto the surfaces of flexible metal foils to form electrodes (anodes and cathodes). The formed electrodes are also typically compressed under high pressure to increase density and control thickness. These compressed electrode/foil composites are then slitted into sizes and/or shapes that are appropriate for the particular form factor of the manufactured battery. The slitted electrode composites are typically co-wound or co-stacked with intervening ionically-conductive/electronically-insulating separator membranes to construct battery windings, i.e. "jelly rolls" or "stacks," which are then packaged in metal cans, flexible polymer pouches, etc. The resulting cells can be infiltrated with liquid electrolyte that need be introduced in a carefully controlled environment.

Alternatively, a more advanced, mass-production process has been developed recently capable of producing binder-less electrodes that includes combining active materials with conductive additives and electrolyte to form a semi-solid electrode slurry. The semi-solid electrode slurry can be mixed in a mixing apparatus, such as a high shear mixer, a planetary mixer, a centrifugal planetary mixer, a sigma mixer, a CAM mixer, a roller mixer, a ball mill mixer and/or a homogenizer, and then formed into a semi-solid electrode. Examples of this semi-solid electrode mixing process are described in U.S. Patent Publication No. 2013/0337319, (also referred to as "the '319 publication") entitled "Electrochemical Slurry Compositions and Methods for Preparing the Same," the entire disclosure of which is hereby incorporated by reference. Although this approach avoids the use of conventional binding agents, and the subsequent casting, drying, and calendaring steps altogether, it can be difficult to achieve a substantially stable electrode suspension with sufficient ionic conductivity without overmixing. In other words, achieving an inter-particle network of conductive pathways within the electrode suspension can be quite challenging due to the shearing of the chains of conductive additive materials during the mixing process. On the other hand, if the electrode materials are under mixed, the conductive additives can remain agglomerated, and a portion of the active material can be excluded from the conductive network since there are no conductive pathways for those active particles, rendering them useless.

Although the binder-less semi-solid electrode manufacturing process described above provides several advantages over the conventional approach by producing a "finished" electrode material with electrolyte already incorporated, there are some shortcomings due to the requirement for precise mixing. Embodiments of semi-solid electrode compositions and methods of preparation described herein can provide several advantages over the conventional battery manufacturing process and the semi-solid electrode manufacturing process described above by separating the mixing step into two; first by pre-mixing the active materials with conductive additives to form a "dry" powder mixture (also referred to herein as "dry electrode mixture" or "mixed powders"), and second, subsequently infusing the electrolyte into the dry powder mixture. Infusing the electrolyte after combining the dry electrode ingredients can avoid the shearing or agglomeration problems that can exist in the earlier methods of binder-less electrode manufacturing. Some additional benefits of this infusing mixing approach include, for example: (i) simplified manufacturing with less equipment (i.e., less capital intensive), (ii) the ability to manufacture electrodes of different thicknesses (e.g., by simply changing a forming die dimension), (iii) processing of thicker (>200 µm) and higher capacity (mAh/cm$^2$) electrodes, thereby decreasing the volume, mass, and cost contributions of inactive components with respect to active material, (iv) the elimination of binding agents (e.g., PVdF), thereby reducing tortuosity and increasing ionic conductivity of the electrode, as well as increasing safety by excluding binders that can contribute to exothermic reactions, (v) densification of the electrode and resulting mixture by compressing the dry powder mixer, and (vi) pre-charging process becomes simpler due to the ability to add the lithium metal (as powder or foils) to the dry powder mixture; the lithium metal reacts and pre-charge is completed during the electrolyte infusion process. Examples of battery architectures utilizing semi-solid suspensions are described in International Patent Publication No. WO 2014/093876 (also referred to as "the '876 publication"), entitled "Semi-Solid Electrodes Having High Rate Capability," U.S. Patent Publication No. 2014/0315097 (also referred to as "the '097 publication"), entitled "Asymmetric Battery Having a Semi-Solid Cathode and High Energy Density Anode," U.S. Patent Publication No. 2013/0065122 (also referred to as "the '122 publication"), entitled "Semi-Solid Electrode Cell Having a Porous Current Collector and Methods of Manufacture," and U.S. Provisional Application No. 62/075,373 (also referred to as "the '373 application"), entitled "Electrochemical Cells Having Semi-Solid Electrodes and Methods of Manufacturing The Same," the entire disclosures of which are hereby incorporated by reference.

Embodiments described herein relate generally to electrochemical devices such as, for example, lithium ion batteries, however, the systems, methods and principles described herein are applicable to all devices containing electrochemically active media. Said another way, any electrodes and/or devices including at least an active material (source or sink of charge carriers), an electronically conducting additive, and an ionically conducting media (electrolyte) such as, for example, batteries, capacitors, electric double-layer capacitors (e.g., ultracapacitors), pseudo-capacitors, etc., are within the scope of this disclosure.

In some embodiments, a method of preparing a semi-solid electrode (also referred to herein as "semi-solid suspension" and/or "slurry" electrode) can include combining a quantity of an active material with a quantity of a conductive material to form an intermediate material. The intermediate material is then compressed, and an electrolyte is infused into the compressed intermediate material to form a working semi-solid electrode material. In other words, the working semi-solid electrode material is ionically conductive and is capable of taking up or releasing ions. The working semi-solid electrode material can then be formed into a semi-solid electrode. In some embodiments, the intermediate material can be formed into an electrode form factor prior to infusion of the electrolyte. Optionally, the infusing of the electrolyte can be vacuum assisted. Said another way, a vacuum can be applied to the compressed intermediate material to evacuate gas (e.g., air) so that the liquid electrolyte can more easily flow into the compressed intermediate material.

In some embodiments, the composition of the slurry and the mixing process can be selected to homogeneously disperse the components of the slurry, achieve a percolating conductive network throughout the slurry and sufficiently high bulk electrical conductivity, which correlates to desirable electrochemical performance as described in further detail herein, to obtain a rheological state conducive to processing, which may include transfer, conveyance (e.g., extrusion), dispensing, segmenting or cutting, and post-dispense forming (e.g., press forming, rolling, calendering, etc.), or any combination thereof.

As used herein, the terms "about," "approximately," and "substantially" when used in connection with a numerical value generally means plus or minus 10% of the value stated, e.g., about 5 would include 4.5 to 5.5, about 10 would include 9 to 11, and about 100 would include 90 to 110.

As used herein, the term "semi-solid" refers to a material that is a mixture of liquid and solid phases, for example, such as a slurry, particle suspension, colloidal suspension, emulsion, gel, or micelle. In some embodiments, the emulsion or micelle in a semi-solid includes a solid in at least one of the liquid-containing phases. In some embodiments, the solid within the semi-solid can remain un-dissolved within the energy storage device during operation of the energy storage device, such that a solid phase remains present within the electrochemically active fluid during operation of the device. For example, the electrode active material and the electrolyte can be selected, in some embodiments, such that the electrode active material does not dissolve within the electrolyte during operation of the energy storage device.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

FIG. 1 shows a flow diagram showing an exemplary method 100 of preparing a semi-solid electrode. In some embodiments, the method 100 includes combining an active material and a conductive material to form a dry powder mixture, at 120. The active material can be any ion storage material, including any ion-storing compound or ion-storing redox composition that is capable of undergoing Faradaic reaction in order to store energy. Said another way, the active material can take up or release ions during Faradaic reaction, i.e., charging and discharging. In some embodiments, the active materials can utilize various working ions, such as H$^+$ and OH$^-$ in aqueous systems, Li$^+$ and Na$^+$ in non-aqueous systems, and Ca$^{2+}$, Mg$^{2+}$, and Al$^{3+}$ in alkaline systems.

In some embodiments, the active material can be a cathode active material or an anode active material. Examples of cathode active materials that can be used in the method 100 of preparing a semi-solid electrode include solid compounds known to those skilled in the art as those used in NiMH (Nickel-Metal Hydride) Nickel Cadmium (NiCd) batteries. Still other cathode active compounds for Li storage include those used in carbon monofluoride batteries, generally referred to as CF$_x$, or metal fluoride compounds having approximate stoichiometry $MF_2$ or $MF_3$ where M comprises Fe, Bi, Ni, Co, Ti, V. Examples include those described in H. Li, P. Balaya, and J. Maier, Li-Storage via Heterogeneous Reaction in Selected Binary Metal Fluorides and Oxides, *Journal of The Electrochemical Society*, 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", J. Electrochem. Soc., 153, A799 (2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", *J. Electrochem. Soc.*, 152, A307 (2005).

Exemplary cathode active materials in a lithium system include the general family of ordered rocksalt compounds $LiMO_2$ including those having the α-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA") and Li(Ni, Mn, Co)$O_2$ (known as "NMC"). Other families of exemplary electroactive materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In one or more embodiments, the active material comprises a transition metal polyanion compound, for example as described in U.S. Pat. No. 7,338,734. In one or more embodiments the active material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)(X_2D_7)_z$, and have values such that x, plus y(1−a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)z(A_{1-a}M''_a)_x M'_y(X_2D_7)_z$ and have values such that (1−a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments, the redox-active electrode material comprises a metal salt that stores an alkali ion by undergoing a displacement or conversion reaction. Examples of such compounds include metal oxides, such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides, such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the cathode active material in a lithium battery. In other embodiments, the redox-active electrode material comprises carbon monofluoride or its derivatives. In some embodiments, the material undergoing displacement or conversion reaction is in the form of particulates having on average dimensions of 100 nanometers or less. In some embodiments, the material undergoing displacement or conversion reaction comprises a nanocomposite of the active material mixed with an inactive host, including but not limited to conductive and relatively ductile compounds such as carbon, or a metal, or a metal sulfide. $FeS_2$ and $FeF_3$ can also be used as cheap and electronically conductive active materials in a non-aqueous or aqueous lithium system.

In some embodiments, the working ion is selected from the group consisting of $Li^+$, $Na^+$, $H^+$, $Mg^{2+}$, $Al^{3+}$, or $Ca^{2+}$.

In some embodiments, the working ion is selected from the group consisting of $Li^+$ or Na.

In some embodiments, the ion is proton or hydroxyl ion and the ion storage compound includes those used in a nickel-cadmium or nickel metal hydride battery.

In some embodiments, the ion is lithium and the ion storage compound is selected from the group consisting of metal fluorides such as $CuF_2$, $FeF_2$, $FeF_3$, $BiF_3$, $CoF_2$, and $NiF_2$.

In some embodiments, the ion is lithium and the ion storage compound is selected from the group consisting of metal oxides such as CoO, $CO_3O_4$, NiO, CuO, MnO.

In some embodiments, the ion is lithium and the ion storage compound includes an intercalation compound selected from compounds with formula $Li_{1-x-z}M_{1-z}PO_4$, wherein M includes at least one first row transition metal selected from the group consisting of Ti, V, Cr, Mn, Fe, Co and Ni, wherein x is from 0 to 1 and z can be positive or negative.

In some embodiments, the ion is lithium and the ion storage compound includes an intercalation compound selected from compounds with formula $(Li_{1-x} Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the ion storage compound includes an intercalation compound selected from compounds with formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1-a) times a formal valence or valences of M', plus ya times a formal valence or valence of M", is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of $A_{1-a}M''_a)_xM'_y(XD_4)_z$, $(A_{1-a}M''_a)_xM'_y(DXD_4)_z$ and $A_{1-a}M''_a)_xM'_y(X_2D_7)_z$, where (1-a)x plus the quantity ax times the formal valence or valences of M" plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg, or Zr.

In some embodiments, the flowable semi-solid ion-storing redox composition cathode active material includes a solid including amorphous carbon, disordered carbon, graphitic carbon, or a metal-coated or metal-decorated carbon.

In some embodiments, the cathode active material includes a solid including a metal or metal alloy or metalloid or metalloid alloy or silicon.

In some embodiments, the cathode active material includes a solid including nanostructures including nanowires, nanorods, and nanotetrapods.

In some embodiments, the cathode active material includes a solid including an organic redox compound.

In some embodiments, the cathode active material includes a solid selected from the group consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, wherein M includes at least one first-row transition metal but may include non-transition metals including but not limited to Al, Ca, Mg, or Zr and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the cathode active material includes a solid selected from the group consisting of $A_x(M'_{1-a}M''_a)_y(XD_4)_z$, $A_x(M'_{1-a}M''_a)_y(DXD_4)_z$, and $A_x(M'_{1-a} M''_a)_y(X_2D_7)_z$, and where x, plus y(1-a) times a formal valence or valences of M', plus ya times a formal valence or valence of M", is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the cathode active material includes a compound with a spinel structure.

In some embodiments, the cathode active material includes a compound selected from the group consisting of $LiMn_2O_4$ and its derivatives; layered-spinel nanocomposites in which the structure includes nanoscopic regions having ordered rocksalt and spinel ordering; so-called "high voltage spinels" with a potential vs. Li/Li+ that exceeds 4.3V including but not limited to $LiNi0.5Mn1.5O_4$; olivines $LiMPO_4$ and their derivatives, in which M includes one or more of Mn, Fe, Co, or Ni, partially fluorinated compounds such as $LiVPO_4F$, other "polyanion" compounds, and vanadium oxides $V_xO_y$ including $V_2O_5$ and $V_6O_{11}$.

Examples of anode active materials that can be used in the method 100 of preparing a semi-solid electrode include, for example, lithium metal, carbon, lithium-intercalated carbon, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof.

As another example, fullerenic carbon including single-wall carbon nanotubes (SWNTs), multiwall carbon nanotubes (MWNTs), or metal or metalloid nanowires may be used as ion-storing anode active materials. One example is the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, *Nature Nanotechnology*, published online 16 Dec. 2007; doi.10.1038/nnano.2007.411.

In some embodiments, more than one kind of active material can be used in order to achieve improved battery performance and/or to achieve a more densified electrode. In some embodiments, materials with varying particle sizes can be used in order to achieve a more densified electrode structure.

In some embodiments, more than one kind of conductive material can be used in order to achieve a better conductive network and/or to achieve a more densified electrode. In some embodiments, conductive materials with varying particle sizes can be used in order to obtain a more densified electrode.

In some embodiments, the conductive materials can be any material capable of increasing the electronic conductivity of any of the cathode active material or any of the anode active material by forming a conductive network of the active materials, i.e., a percolating conductive network of active particles or materials. Said another way, a conductive network of active particles or materials in the dry powder mixture, and in subsequent finished electrodes containing the dry powder mixture, can be created by combining the conductive materials with the active materials. In some embodiments, the addition of conductive materials increases bulk electrical conductivity within the dry powder mixtures and finished electrodes.

Examples of conductive materials that can be used in the method 100 of preparing a semi-solid electrode include solid inorganic conductive materials, including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments. In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes).

The amount of active material and conductive material combined in step 120 can be selected based on the desired ratio of the materials in the final electrode. In other words, the relative percentage of active material and conductive material in the dry powder mixture can be determined based on the desired volume percentage or weight percentage in the final electrode. For example, if the design specification of the final electrode is 50% by volume of active material and 2% by volume of conductive material, then the volume ratio of the active material to the conductive material in the final electrode is 25 to 1. In some embodiments, the ratio of active materials to conductive materials can vary for semi-solid cathodes and semi-solid anodes.

In some embodiments, a semi-solid cathode can include about 35% to about 75% by volume of a cathode active material. In some embodiments, a semi-solid cathode can include about 40% to about 75% by volume, about 45% to about 75% by volume, about 50% to about 75% by volume, about 55% to about 75% by volume, about 60% to about 75% by volume, or about 65% to about 75% by volume of a cathode active material, inclusive of all ranges therebetween.

In some embodiments, a semi-solid cathode can include about 0.5% to about 8% by volume of a conductive material. For example, in some embodiments, a semi-solid cathode can include about 0.6% to about 7.5% by volume, about 0.7% to about 7.0% by volume, about 0.8% to about 6.5% by volume, about 0.9% to about 6% by volume, about 1.0% to about 6% by volume, about 1.5% to about 5.0% by volume, or about 2% to about 4% by volume of a conductive material, inclusive of all ranges therebetween.

In some embodiments, the volume ratio of the cathode active materials to the conductive materials can range from about 4:1 (minimum cathode active material of 35% by volume divided by maximum conductive material of 8% by volume) to about 150:1 (maximum cathode active material of 75% by volume divided by minimum conductive material of 0.5% by volume). In some embodiments, the volume ratio of the cathode active materials to the conductive materials can range from about 4:1 to about 150:1, from about 5:1 to about 120:1, from about 10:1 to about 100:1, from about 10:1 to about 80:1, from about 10:1 to about 70:1, from about 10:1 to about 60:1, from about 10:1 to about 50:1, from about 10:1 to about 40:1, from about 10:1 to about 35:1, from about 10:1 to about 30:1, from about 12:1 to about 30:1, from about 15:1 to about 30:1, from about 15:1 to about 28:1, from about 15:1 to about 27:1, from about 15:1 to about 26:1, from about 15:1 to about 25:1, from about 16:1 to about 25:1, from about 17:1 to about 25:1, from about 18:1 to about 25:1, from about 19:1 to about 25:1, from about 20:1 to about 25:1, inclusive of all ranges of volume ratio therebetween.

In some embodiments, a semi-solid anode can include about 35% to about 75% by volume of an anode active material. In some embodiments, a semi-solid anode can include about 40% to about 75% by volume, about 45% to about 75% by volume, about 50% to about 75% by volume, about 55% to about 75% by volume, about 60% to about 75% by volume, or about 65% to about 75% by volume of an anode active material, inclusive of all ranges therebetween.

In some embodiments, a semi-solid anode can include about 0.1% to about 10% by volume of a conductive material. In some embodiments, a semi-solid anode does not include any conductive material. In some embodiments, a semi-solid anode can include about 0.2% to about 9% by volume, about 0.4% to about 8% by volume, about 0.6% to about 7% by volume, about 0.8% to about 6% by volume, about 1% to about 5% by volume, or about 2% to about 4% by volume of a conductive material, inclusive of all ranges therebetween. In some embodiments, the semi-solid anode includes about 1% to about 6% by volume of a conductive material. In some embodiments, the semi-solid anode includes about 0.5% to about 2% by volume of a conductive material.

In some embodiments, the volume ratio of the anode active materials to the conductive materials can range from about 3.5:1 (minimum anode active material of 35% by volume divided by maximum conductive material of 10% by volume) to about 750:1 (maximum anode active material of 75% by volume divided by minimum conductive material of 0.1% by volume). In some embodiments, the volume ratio of the anode active materials to the conductive materials can range from about 3:1 to about 750:1, from about 5:1 to about 500:1, from about 5:1 to about 250:1, from about 10:1 to about 200:1, from about 10:1 to about 150:1, from about 10:1 to about 120:1, from about 10:1 to about 100:1, from about 10:1 to about 80:1, from about 10:1 to about 70:1, from about 10:1 to about 60:1, from about 10:1 to about 50:1, from about 10:1 to about 40:1, from about 10:1 to about 35:1, from about 10:1 to about 30:1, from about 12:1 to about 30:1, from about 15:1 to about 30:1, from about 15:1 to about 28:1, from about 15:1 to about 27:1, from about 16:1 to about 27:1, from about 17:1 to about 27:1, from about 18:1 to about 27:1, from about 19:1 to about 27:1, from about 20:1 to about 27:1, from about 20:1 to about 26:1, from about 20:1 to about 25:1, inclusive of all ranges of volume ratio therebetween.

In some embodiments, the active material and the conductive material can be combined in a container of a mixing apparatus (also referred to herein as a "chamber" or "vessel"). The mixing apparatus can be, for example, a high shear mixer, a planetary mixer, a centrifugal planetary mixer, a sigma mixer, a CAM mixer, a roller mixer, a ball mill mixer and/or a homogenizer. The mixing time (i.e., duration), speed of mixing, and/or other mixing parameters can be adjusted depending on the ratio of the active material the conductive material, the materials themselves, and other variables to achieve optimal mixing.

During the mixing process, there are several process conditions and/or quality control metrics that can be used to monitor and/or determine whether the dry powder mixture is sufficiently well mixed. One method of monitoring the mixing process includes visual inspection of the dry powder mixture. For example, an operator can visually inspect the texture of the mixture periodically or at predetermined time intervals and determine (i.e., qualitatively) whether the dry powder mixture looks "pasty" or if any agglomerates of one or both materials are present. Said another way, a well-mixed dry powder mixture should be homogeneous throughout and substantially free of lumps and agglomerates. Once the dry powder mixture passes visual inspection, the mixture can be further examined under an optical and/or electron microscope. This secondary inspection can be used to evaluate the degree of mixing at the microscopic level. The active materials and conductive materials are usually micrometer sized powders and particulates or smaller, making visual inspection challenging. In other words, although the dry powder mixture may look sufficiently well mixed with the naked eye, microscopic inspection can reveal insufficient mixing, agglomerates, and/or other mixing imperfections.

In some embodiments, the dry powder mixture can optionally be evacuated by applying a vacuum 130, prior to compression 140. In some embodiments, the application of vacuum can be performed via an outlet port of the compressing chamber. Drawing a vacuum can, for example, help ensure that substantially all of the air is removed prior to electrolyte infusion and help with compression of the dry powder mixture. In some embodiments, compression of the dry powder mixture can be performed without applying vacuum.

After the dry powder mixture is well mixed, the dry powder mixture is compressed, at 140. In order to achieve, for example, a well-mixed dry powder mixture with 50% by volume of active material and 2% by volume of conductive material, the remaining 48% by volume has to be filled with electrolyte, so that the desired ratio between the active material, the conductive material and the electrolyte is 25 to 1 to 24. Since the mixing of dry powders does not include the electrolyte, the dry powder mixture is relatively light and fluffy, i.e., the loosely-packed dry powder mixture has air gaps within the dry powder mixture. The volume of air occupying the air gaps within the dry powder mixture can be reduced by compressing the dry powder mixture. Said another way, the volume percentage of air in the air gaps can be reduced by compressing the dry powder mixture in order to achieve the desired ratio of 25 to 1 to 24 between the active material, the conductive material, and the air gaps. The air gaps (i.e., voids) can then be filed with the electrolyte.

In some embodiments, the volume expansion that can occur when the electrode undergoes electrochemical reaction can also be considered in determining the compression of the electrode. For example, lithiation and delithiation in lithium-based electrodes can create volume expansion and contraction, and therefore, knowing the amounts and ratio between the active material and the conductive material during the combining step 120 is beneficial when determining the range and amount of pressure and/or displacement to be exerted in the compressing step 140. This calculation can be done to achieve the desired density and porosity to accommodate the active material when it expands during the electrochemical operation of the electrode.

In some embodiments, the compressing step 140 begins with introducing the dry powder mixture into an exemplary compressing container (also referred to herein as vessel or chamber). Once the dry powder mixture is in the compressing container, the dry powder mixture can be compressed by a moving piston. In some embodiments, the piston that compresses the dry powder mixture can also seal the chamber completely or substantially completely to ensure air is removed from the vessel.

In some embodiments, there can be two mechanical parameters or modes of control during compression of the dry powder mixture, i.e., via displacement control and via pressure control. Said another way, the dry powder mixture can be compressed by the piston to a predetermined amount of displacement or to a predetermined amount of pressure. Each of the compression modes has advantages and can be suitable for compressing certain types of dry powder mixtures.

In some embodiments, for example, to achieve a desired ratio of 25 to 1 to 24 between an active material, a conductive material, and electrolyte, the dry powder mixture can be compressed to a predetermined volume via the displacement control to achieve the ratio of 25 to 1 to 24. This will ensure that the compressed dry powder mixture will contain the desired percentage of air volume within the dry powder mixture into which the correct amount of electrolyte will later be infused.

In some embodiments, the pressure control compressing mode can be used to prevent damage to any of the active material or the conductive material during the compression of the dry powder mixture. In some embodiments, the pressure control compressing mode can be used to ensure that the dry powder mixture is not compressed beyond the point to fuse, shear or otherwise damage the active material and the conductive material. In some embodiments, controlling and maintaining the compression within the desired pressure range can prevent degradation to the conductive network formed from combining the conductive material with the active material.

After the dry powder mixture has been compressed, at step 140, the compressed dry powder mixture can be inspected to determine if the desired level of compression has been achieved. In some embodiments, a porosity examination, such as Brunauer-Emmett-Teller (BET) or mercury porosimetry can be performed. From this examination, the density of materials in the compressed dry powder mixture, and hence the volumetric ratio of the dry powder mixture to the air gaps within the compressed dry powder mixture can be determined. This information can verify whether the dry powder mixture has been compressed to the desired amount of compressing to achieve the desired percentage of air gaps within the dry powder mixture.

When the dry powder mixture is compressed to the desired level of displacement, and hence it reaches or substantially reaches the desired ratio between the active materials, the conductive materials and the air gaps, an infusing step 170 can commence as shown in FIG. 1. The infusion step 170 is a manufacturing step in which an electrolyte or a plurality of electrolytes is infused into the gaps within the compressed dry powder mixture. Since the compressed dry powder mixture has been compressed to maintain the volumetric ratio between the active materials, the conductive materials, and the electrolyte (occupied by "air" in the gaps prior to infusion), the infusing step 170 facilitates the removal of air in the gaps by infusing with the electrolyte, without changing density of and porosity within the compressed dry powder mixture.

In some embodiments, the infusion of electrolyte 170 begins via an inlet port of the compressing chamber that is sealed, i.e., so that no electrolyte can escape from the chamber. In some embodiments, to aid the infusion of electrolyte, the compressed dry powder mixture can optionally be evacuated by applying a vacuum 160, prior to the infusion of electrolyte 170. In some embodiments, the application of vacuum can be performed via an outlet port of the compressing chamber. In some embodiments, the infusion of electrolyte can be performed without applying vacuum by introducing the electrolyte via the inlet port. In some embodiments, the inlet port and the outlet port can be the same port but the steps of evacuating and infusing are performed at different times. For example, the compressing chamber can be evacuated first and infused with electrolyte afterward via the same port.

In some embodiments, one or more gases (e.g., a mixture of gases) or one or more solvents (e.g., a mixture of solvents) can be introduced into the compressed dry powder mixture prior to infusing the electrolyte 170. Solvents and gases, such as methane, propane, methanol, ethanol, nitrogen, argon, carbon monoxide, carbon dioxide, oxygen, ozone, hydrogen, chlorine, and hydrogen chloride can be formulated to aid in the wetting of the compressed intermediate material to facilitate the infusion of the electrolyte. In some embodiments, the air can be evacuated by applying a vacuum 160, and then the wetting gas or gas mixture, or solvent or solvent mixture can be introduced into the compressed dry powder mixture. In some embodiments, the wetting gas or the wetting solvent can be used to directly displace the air from the compressed dry powder mixture. The wetting agent (i.e., wetting gas or wetting solvent) can then be evacuated (e.g., by applying a vacuum) prior to infusion of the electrolyte, or the electrolyte can directly displace the wetting gas or the wetting solvent as it is infused into the compressed dry powder mixture. In some embodiments, the air can be evacuated from the compressed intermediate material during a first time period by applying a vacuum 160. The wetting agent can then be introduced into the compressed dry power mixture. The wetting agent can then be evacuated from the compressed intermediate material during a second time period by applying a vacuum 160.

Regardless of whether the chamber containing the compressed dry powder mixture is under vacuum or displaced by a wetting gas or a wetting solvent, the amount of electrolyte infused into the mixture is predetermined according to the ratio of materials in the final finished electrode. In some embodiments, the range of total percentage of electrolyte by volume to be infused into the compressed dry powder mixture can be from about 10% by volume to about 70% by volume.

In some embodiments, a semi-solid cathode can include about 25% to about 70% by volume of an electrolyte. In some embodiments, a semi-solid cathode can include about 30% to about 50%, or about 20% to about 40% by volume of an electrolyte, inclusive of all ranges therebetween.

In some embodiments, a semi-solid anode can include about 10% to about 70% by volume of an electrolyte. In some embodiments, a semi-solid anode can include about 30% to about 50%, or about 20% to about 40% by volume of an electrolyte, inclusive of all ranges therebetween.

In some embodiments, the electrolytes used in the infusing step can include a non-aqueous liquid electrolyte that can include polar solvents such as, for example, alcohols or aprotic organic solvents. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include y-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, and the like. These non-aqueous solvents are typically used as multicomponent mixtures, into which a salt is dissolved to provide ionic conductivity. Exemplary salts to provide lithium conductivity include $LiClO_4$, $LiPF_6$, $LiBF_4$, LiTFSI, LiBETI, LiBOB, and the like.

In some embodiments, the electrolyte or a combination of electrolytes to be infused into the compressed dry powder mixture is stored in a valved electrolyte container or a metered syringe that is connected to the compressing chamber via the inlet port. The valved electrolyte container or a metered syringe can contain more than the predetermined amount of electrolyte to be infused into the compressed dry electrode mixture. By opening the valve of the electrolyte container or by pressing the metered syringe, the electrolyte is infused into the compressed dry powder mixture. Closing the valve of the electrolyte container or removing the force applied to the metered syringe stops the infusion of electrolyte. In some embodiments, if the compression chamber is substantially sealed, the pressure inside the compressing chamber can increase due to the infusion of the electrolyte thereby making it difficult to finish the delivery/infusion of the full volume of electrolyte. In some embodiments, the compression chamber can include a gas port or vent to allow the gas to exit the compression chamber during infusion. In other words, the infusion of the liquid electrolyte can displace any case that is present in the dry powder mixture (i.e., in the air gaps). In some embodiments, a suction force or vacuum can be applied to the compression chamber prior to or during infusing to remove any gas present in the dry powder mixture. Once all of the electrolyte is infused into the compressed dry powder mixture, the electrolyte is considered to have wet the entire network porous and dense compressed mixture of active and conductive materials. Said another way, a working electrode (also referred to as "wet electrode") is considered achieved. In some embodiments, an additional pressing step can be completed after infusing the electrolyte 170 in order to achieve an electrode that is more densified.

One advantage of infusing electrolyte after the active material and conductive materials have been mixed and pressed is that the porous nature of the compressed dry powder mixture is maintained and the infused electrolyte wets all of the porous and gap surfaces inside the compressed dry powder mixture. Introducing the electrolyte earlier during the mixing of the dry powders can impart non-uniformity in wetting throughout the compressed dry powder mixture. Said another way, if the electrolyte is introduced when the active material powders and conductive material powders are put in a container, the powders may not be mixed well. When mixing in a high speed or high shear mixing apparatus, the non-uniformity in the electrolyte wetting/distribution throughout the unmixed dry powder mixture or ensemble can aid shearing of the conductive carbon chains in the conductive network created by the presence of the conductive materials.

Once a working wet electrode is achieved, the final step as shown in the process flow diagram illustrated in FIG. 1 is to from a semi-solid electrode 180 on a current collector. Here, the current collector can be a positive current collector if the active material is a cathode active material and the current collector can be a negative current collector if the active material is an anode active material. Regardless, current collectors are electronically conductive and are electrochemically inactive under the electrochemical operating conditions of the electrode. Typical current collectors for lithium ion electrodes include copper, aluminum, or titanium for the negative current collector and aluminum for the positive current collector, in the form of sheets or mesh, or any combination thereof. Current collector materials can be selected to be stable at the operating potentials of the semi-solid electrode. For example, in non-aqueous lithium systems, the positive current collector can include aluminum, or aluminum coated with conductive material that does not electrochemically dissolve at operating potentials of 2.5-5.0V with respect to $Li/Li^+$. Such materials include platinum, gold, nickel, conductive metal oxides such as vanadium oxide, and carbon. The negative current collector can include copper or other metals that do not form alloys or intermetallic compounds with lithium, carbon, and/or coatings comprising such materials disposed on another conductor. Each of the positive current collector and the negative current collector can have a thickness of less than about 20 microns, for example, about 4 microns, about 5 microns, about 6 microns, about 7 microns, about 8 microns, about 9 microns, about 10 microns, about 12 microns, about 14 microns, about 16 microns, or about 18 microns, inclusive of all ranges therebetween. Use of such thin positive current collector and negative current collector can substantially reduce the cost and overall weight of the electrodes.

Transferring the working wet electrode onto a current collector can be done in a number of different ways. In some embodiments, the working electrode can be disposed onto a current collector. In some embodiments, the working electrode can be dispensed via a controlled nozzle or something similar in nature, onto a current collector. The amount of dispensing can be controlled by controlling the opening of the nozzle, a valve, or other flow control mechanism. In some embodiments, the amount dispensed can be controlled via the thickness of the electrode disposed on the current collector. In some embodiments, the amount dispensed can be controlled by the amount of working electrode material that is extruded from the chamber containing the working electrode material. In some embodiments, the working electrode can be dispensed via a rectangle nozzle that is configured to dispense the working electrode an entire width of a current collector. This technique can be referred to as "tape casting" of the working electrode. In this embodiment, the amount of working electrode dispensed is controlled in a way that the dispensed portion of electrode material covers an entire width of the current collector and by moving the current collector in such a way that the newly dispensed working electrode material covers new surface area on the current collector. This technique is similar to inkjet printing, where new material is deposited as the paper and the write-head moves.

In some embodiments, the nozzle, in the traditional sense or in the "tape casting" dispensing design, can be oriented either perpendicular to or at an angle with respect to the current collector below. This design flexibility provides, for example, many manufacturing controls that can enable optimization of the semi-solid electrode forming process, including thickness-control of final finished electrodes, uniformity of the thickness across the entire electrode, i.e., how the thickness varies in the middle of the current collector versus on the edges versus the beginning and the end of dispensing, and speed of dispensing at which finished electrodes can be produced, etc.

In order to produce final finished semi-solid electrodes, a number of tools can be used. In some embodiments, a high-precision displacement mechanism can be used in the nozzle or extruding apparatus to help accurately determine the amount of working wet electrode dispensed. In some embodiments, non-contact thickness measurement tools, such as a scanning laser interferometer or ellipsometer can be used in situ during forming of the semi-solid electrode to help produce the desired electrode with a correct electrode thickness. In some embodiments, a die set with a spacer placed onto a current collector prior to dispensing the working wet electrode can be used to ensure final finished semi-solid electrodes with proper electrode thickness are produced. In some embodiments, the extruded wet electrode dispensed can be slightly greater than the required amount, and excess wet electrode can be removed (e.g., scrapped using a blade against the spacer placed within the die set). Once an electrode with proper thickness and thickness uniformity is obtained, the finished semi-solid electrode is produced.

FIGS. 2A and 2B are illustrations of an exemplary embodiment of an infusion apparatus 210, presented in assembled view and in exploded view, respectively, to show various components of the infusion apparatus 210. In some embodiments, the infusing apparatus 210 can be used to combine a dry powder mixture until it is well-mixed. The infusing apparatus 210 can then be used to compress the dry powder mixture, evacuate the air, and then infuse liquid electrolyte into the compressed dry powder mixture to produce a working semi-solid electrode material. The working semi-solid electrode mixture can then be disposed on a current collector to form finished semi-solid electrodes.

As shown in FIGS. 2A and 2B, an infusion apparatus 210 includes a top manifold 220, a container 230 that defines an inner volume 232, and a bottom manifold 240. The container 230 can be coupled to the bottom manifold 240 and a dry powder mixture (not shown) can be added to the inner volume 232. Once the dry powder mixture is disposed in the inner volume 232, the top manifold 220 can be coupled to the container 230 to seal the inner volume 232 from an external environment. In some embodiments, the top manifold 220 can be movable with respect to the container 230 and can include a piston 222 that is configured to apply compressive force to the dry powder mixture disposed in the inner volume 232. In other words, the top manifold 220 can be used to seal the container 230 and act as the piston 222 to compress the dry powder mixture.

A bottom manifold 240 includes a vacuum port 262 configured to be coupled to a vacuum source (not shown) and a top manifold 220 includes an inlet port 272 configured to be coupled to an electrolyte supply (not shown). Optionally, the top manifold 220 and/or the bottom manifold 240 can include pressure ports 264a, 264b (collectively referred to herein as pressure ports 264). Although the vacuum port 262 is shown in FIGS. 2A and 2B as being included in the bottom manifold 240, the vacuum port 262 can be included in the top manifold 220. In some embodiments, multiple vacuum ports 262 can be included in the top manifold 220, the bottom manifold 240, or in both manifolds. Similarly, although the inlet port 272 is shown in FIGS. 2A and 2B as being included in the top manifold 220, the inlet port can be included in the bottom manifold 240. In some embodiments, multiple inlet ports 272 can be included in the top manifold 220, the bottom manifold 240, or in both manifolds. In some embodiments, the inlet port 272 and/or vacuum port 262 can be included in the container 230.

In some embodiments, after the dry powder mixture is compressed, the inner volume 232 can be evacuated by drawing a vacuum on the inner volume 232 via the vacuum port 262. The pressure in the inner volume 232 can be monitored via the pressure ports 264 until the pressure in the inner volume is reduced to a predetermined pressure. In other words, air that is present in the inner volume 232 from the mixing process and/or the compression process can be removed via the outlet port 262 until the inner volume 232 is substantially evacuated. Once the predetermined pressure is reached, the liquid electrolyte can be infused into the inner volume 232 via the inlet port 272 to produce the working semi-solid electrode material. In some embodiments, the inlet port 272 and the vacuum port 262 can be the same port, but the steps of evacuating and infusing are performed at different times. For example, the inner volume 232 can be evacuated first and infused with electrolyte afterward via the same port. In some embodiments, the outlet port 262 and vacuum port 262 can be the same port. In some embodiments, a separate outlet port 262 and vacuum port 262 can be used. In some embodiments, the placement of the inlet port 272, outlet port 262 and vacuum port 262 can be in the container 230. In some embodiments, the placement of at least one of a) the inlet port 272, b) the outlet port 262, and c) the vacuum port 262 can be in the container 230.

FIGS. 3A-3C collectively illustrate the three stages of the infusion manufacturing process using three exemplary configurations of an infusion apparatus 310. In each of the configurations shown, the infusion apparatus 310 includes a top manifold 320, a container 330 that defines an inner volume 332, and a bottom manifold 340. The bottom manifold 340 has a base plate with a plurality of apertures (also referred to as a porous media 342), which serves as a permeable medium for evacuating trapped air or for infusing electrolyte into the container 330. The container 330 can be coupled to the bottom manifold 340 and a dry powder mixture (shown as particles with different sizes) can be added to the inner volume 332. Once the dry powder mixture is disposed in the inner volume 332, the top manifold 320 can be coupled to the container 330 to seal the inner volume 332 from an external environment.

As shown in FIG. 3A, the top manifold 320 can be movable with respect to the container 330 and can include a piston 322 that is configured to compress the dry powder mixture disposed in the inner volume 332. To perform the compressing step of the infusion manufacturing process, an applied pressure AA can be exerted via the piston 322 to top manifold 320 to compress the dry powder mixture inside the inner volume 332 to a predetermined displacement level. The predetermined displacement level is defined as the relative position of the piston 322, where the linear displacement, i.e., distance travelled by the piston 322, times the compressing surface area of the piston 322 is the displacement volume. The predetermined displacement volume is the volume reduction necessary to generate the predetermined density (volume of solid materials to volume of trapped air) of the compressed dry powder mixture. Once the dry powder mixture is compressed to the predetermined density, the applied pressure AA can be removed to discontinue the compression, but the position of the piston 322 is held in place to maintain the density of the compressed dry powder mixture.

FIGS. 3B and 3C illustrate the subsequent steps in the infusion manufacturing process with another exemplary configuration of the infusion apparatus 310. In this configuration, the bottom manifold 340 includes a port 344 configured to couple to a 3-way valve system 350. The 3-way valve system 350 is coupled to a vacuum pump 360 (shown as a pressure gauge) and to an electrolyte supply 370 (shown as a syringe). In some embodiments, the 3-way valve system 350 can be disposed and configured to close the connections to and from the port 344. In some embodiments, the 3-way valve system 350 can open the connection between the inner volume 332 and the vacuum pump 360. In some embodiments, the 3-way valve system 350 can open the connection between the inner volume 332 and the electrolyte supply 370.

The evacuation of trapped air from the compressed dry powder mixture is illustrated in FIG. 3B. As indicated by the directional arrows BB, the inner volume 332 can be evacuated by drawing a vacuum on the inner volume 332 via the port 344 by setting the 3-way valve system 350 in a first configuration in which fluid communication is established between the port 344 and the vacuum pump 360. The decreasing pressure inside the inner volume 332 can be monitored until the pressure in the inner volume 332 is reduced to a predetermined pressure. In other words, air that is present in the inner volume 332 from the mixing process and/or the compression process can be removed via the port 344 until the inner volume 332 is substantially evacuated.

Once the pressure inside the inner volume 332 is substantially reduced to the predetermined pressure, the 3-way valve system 350 can be moved from the first configuration to a second configuration, in which the vacuum pump 360 is fluidically isolated from the port 344 and fluid communication is established between the port 344 and the electrolyte supply 370. Electrolyte can then flow from the electrolyte supply 370, through the 3-way valve system 350, and into the compressed dry powder mixture, denoted by the direction arrows CC, is illustrated in FIG. 3C. In some embodiments, the electrolyte can by pumped from the electrolyte supply to the inner volume 332 by applying a pressure to the electrolyte supply 370. In some embodiments, the electrolyte can be gravity fed into the inner volume 332 from the electrolyte supply 370. In some embodiments, the electrolyte can be drawn into the inner volume 332 due to the vacuum created in the inner volume 332 by the evacuation of air. In the embodiment illustrated in FIGS. 3A-3C, the same port 344 is used for both evacuating and infusing, but the two steps are performed sequentially. In some embodiments, separate ports can be used for evacuating the air and infusing the electrolyte.

The illustrations in FIGS. 3A-3C show progression of the infusion manufacturing process indicated by changing volumes occupied by the dry powder mixture inside the inner volume 332 of the infusion apparatus 310. The illustration in FIG. 3A shows an original volume of the dry powder mixture before being compressed, while the illustration in FIG. 3B shows a smaller volume of the compressed dry powder mixture after evacuation, and the illustration in FIG.

3C shows the volume of working semi-solid electrode material obtained after the compressed dry powder mixture is infused with electrolyte.

Referring now to FIG. 4, an infusion apparatus 410 is shown that includes more than one inlet/outlet port. The infusion apparatus 410 can be substantially similar to and/or the same as the infusion apparatus 310 described above with reference to FIGS. 3A-3C. Thus, the infusion apparatus 410 is not described in further detail herein. The infusion apparatus 410 includes a top manifold 420, a container 430 that defines an inner volume 432, and a bottom manifold 440. The container 430 can be coupled to the bottom manifold 440 and a dry powder mixture (shown as black) can be added to the inner volume 432. The top manifold 420 includes a piston 422 that is movable with respect to the container 430 to compress the dry powder mixture inside the inner volume 432.

The compressing surface of the piston 422 and the surface of the bottom manifold 440 are both configured with porous media 442a and 442b, respectively (collectively referred to herein as porous media 442). The top manifold 420 and the bottom manifold 440 can include inlet/outlet ports 424 and 444, respectively. Both of the ports 424 and 444 are connected to a Tee 452 so as to combine the outflow from the top manifold 420 and the bottom manifold 440 to a shared external connection. Likewise, the ports 424 and 444 can also distribute the inflow to the top manifold 420 and the bottom manifold 440 from the shared external connection. The other (shared) end of the Tee 452 is connected to a 3-way valve system 450, which is connected to a vacuum pump 460 and an electrolyte source 470. The 3-way valve system 450 can be configured to direct the connection from the Tee 452 towards the vacuum pump 460 for evacuating the inner volume 432. Similarly, the 3-way valve system 450 can be configured to direct the connection from the Tee 452 towards the electrolyte supply 470 for infusion electrolyte.

Operationally, the infusion apparatus 410 shown in FIG. 4 can function substantially similar to the infusion apparatus 310 illustrated and described in FIGS. 3A-3C. Once the dry powder mixture is disposed inside the infusion apparatus 410, a pressure can be applied to compress the dry powder mixture via the moving piston 422 with respect to the container 430. After compressing the dry powder mixture to a predetermined displacement volume, the vacuum pump 460 can be turned on to evacuate trapped air from the compressed dry powder mixture inside the inner volume 432. To do so, the 3-way valve system 450 can be opened so as to direct the connection from the Tee 452 towards the vacuum pump 460. Once opened, the trapped air can diffuse out (also referred to as "be removed" or "be pumped out") from the compressed dry powder mixture through the porous media 442 on both manifolds via the ports 424 and 444 towards the vacuum pump 460.

Once the vacuum inside the infusion apparatus 410 reaches the predetermined pressure level (for example, 28 inches Hg below the atmospheric pressure or "−28 inches Hg"), the 3-way valve system 450 can be closed towards the vacuum pump 460 and opened towards the electrolyte source 470 to infuse electrolyte into the compressed dry powder mixture. Once the connection is made between the electrolyte source 470 and the inner volume 432, the electrolyte can begin to infuse into the compressed dry powder mixture via the ports 424 and 444, through the porous media 442 of both top manifold 420 and bottom manifold 440. A predetermined amount of electrolyte can be infused into the compressed dry powder mixture to produce working semi-solid electrode material. In this embodiment, the infusion apparatus 410 is configured for evacuation of trapped air and infusion of electrolyte from both the top and bottom manifolds to facilitate a more efficient evacuation of trapped air and to enable a more uniform infusion of electrolyte.

Another exemplary embodiment with a distinct configuration of an infusion apparatus 510 is illustrated in FIG. 5. Although substantially similar to the infusion apparatus 410 in FIG. 4, the infusion apparatus 510 is configured to evacuate trapped air from both top and bottom manifolds, but is configured to infuse electrolyte only from the bottom manifold. The infusion apparatus 510 includes a top manifold 520, a container 530 that defines an inner volume 532, and a bottom manifold 540. The container 530 can be coupled to the bottom manifold 540 and a dry powder mixture (shown as black) can be added to the inner volume 532. The top manifold 520 includes a piston 522 that is movable with respect to the container 530 to compress the dry powder mixture inside the inner volume 532. The compressing surface of the piston 522 and the surface of the bottom manifold 540 are both configured with porous media 542a and 542b, respectively (collectively referred to herein as porous media 542). The top manifold 520 and the bottom manifold 540 can include inlet/outlet ports 524 and 544, respectively.

Although similar to the infusion apparatus 410, the infusion apparatus 510 is configured differently to infuse only from the bottom and hence the arrangement of the connections is different. In this configuration, the port 524 in the top manifold 520 is connected to an independent ON/OFF valve 554 that is connected to a vacuum pump 560 through a Tee 552. The ON/OFF value 554 can be independently turned on when needed to allow evacuation of trapped air. Otherwise, the ON/OFF valve 554 can be switched off. The other side of the Tee 552 is connected to a 3-way valve system 550, which can direct the direction of the connection to and from the inlet/outlet port 544 towards either the vacuum pump 560 via the Tee 552 or towards an electrolyte source 570. Hence, the Tee 552 serves as a "splitter" or "combiner" of two separate evacuation target areas (i.e., the top region of the compressed dry powder mixture close to the top manifold 520 and the bottom region of the compressed dry powder mixture close to the bottom manifold 540) for the vacuum pump 560.

Operationally, the infusion apparatus 510 can function substantially similar to the infusion apparatus 410 as shown in FIG. 4. Once the dry powder mixture is disposed inside the infusion apparatus 510, a pressure can be applied via the piston 522 to compress the dry powder mixture. After compressing the dry powder mixture to a predetermined displacement volume, the vacuum pump 560 can be turned on to evacuate trapped air from the inner volume 532. To do so, the 3-way valve system 550 can be opened so as to direct the connection from the 544 towards the vacuum pump 560. Once opened, the trapped air can be removed from the compressed dry powder mixture through the porous media 542b of the bottom manifold 540 via the port 544. If the ON/OFF valve 554 is switched on, the evacuation of trapped air can also be performed through the porous media 542a of the top manifold 520 via the port 524.

Once the vacuum inside the infusion apparatus 510 reaches the predetermined pressure level (for example, 28 inches Hg below the atmospheric pressure or "−28 inches Hg"), the ON/OFF valve 554 can be turned off and the 3-way valve system 550 can be closed towards the vacuum pump 560 to stop evacuation. After evacuation is substantially stopped, the 3-way valve system 550 can be turned towards the electrolyte source 570 to make connection between the inner volume 532 and the electrolyte source 570 to enable infusion of electrolyte into the compressed dry powder mixture. Once the connection is made, the electrolyte can begin to infuse into the compressed dry powder mixture via the port 544 of the bottom manifold 540. A predetermined amount of electrolyte can be infused into the compressed dry powder mixture to produce working semi-solid electrode material. In this embodiment, the infusion apparatus 510 is uniquely configured for evacuation of trapped air from both the top and bottom manifolds to facilitate a more efficient evacuation of trapped air, but it is configured to infuse the electrolyte only from the bottom manifold 540.

Another operational scheme of evacuation/infusion can be performed using this particular configuration of the infusion apparatus 510. For example, by turning ON the ON/OFF valve 554 to allow continuous evacuation of the inner volume 532 by the vacuum pump 560 while turning the direction of the 3-way valve system 550 towards the electrolyte source 570 to infuse electrolyte into the compressed dry powder mixture, the electrolyte can be infused continuously until it reaches the top region of the compressed dry powder mixture. This operational scheme can help facilitate infusion of electrolyte through the bottom manifold 540 by concurrent evacuation of trapped air (and suctioning of electrolyte upwards) via only the top manifold 520.

However, a simplified version of an operationally similar scheme can be implemented in a new configuration of an infusion apparatus 610, as shown in FIG. 6. Substantially similar to the infusion apparatus 510, the infusion apparatus 610 can also include a top manifold 620, a container 630 that defines an inner volume 632, and a bottom manifold 640. The container 630 can be coupled to the bottom manifold 640 and a dry powder mixture (shown as black) can be added to the inner volume 632. The top manifold 620 includes a piston 622 that is movable with respect to the container 630 to compress the dry powder mixture inside the inner volume 632. The compressing surface of the piston 622 and the surface of the bottom manifold 640 are both configured with porous media 642a and 642b, respectively (collectively referred to herein as porous media 642). The top manifold 620 and the bottom manifold 640 can include inlet/outlet ports 624 and 644, respectively. In some embodiments, the inlet/outlet ports 624 and 644, respectively, can be included in the container 630.

In this embodiment, the infusion apparatus 610 is configured for continuous evacuation of trapped air from the top manifold 620 via the port 624, and the infusion of the electrolyte can be performed via the port 644 of the bottom manifold 640. The port 624 of the top manifold 620 is directly connected to the vacuum pump 660 (indicated as a pressure gauge) and the inlet port 644 in the bottom manifold 640 is connected to an electrolyte source 670 via an independent ON/OFF valve 654. The ON/OFF valve 654 can be independently used to control the infusion of the electrolyte into the infusion apparatus 610.

Operationally, the infusion apparatus 610 can function substantially similar to the infusion apparatus 510 as described in FIG. 5. Once the dry powder mixture is disposed inside the infusion apparatus 610, a pressure can be applied via the piston 622 to compress the dry powder mixture. After compressing the dry powder mixture to a predetermined displacement volume, the vacuum pump 560 can be turned on to evacuate trapped air from the inner volume 632. During the evacuation, the ON/OFF valve 654 is turned off to allow evacuate trapped air from the compressed dry powder mixture without enabling infusion of electrolyte. Once the vacuum inside the infusion apparatus 610 reaches the predetermined pressure level (for example, 28 inches Hg below the atmospheric pressure or "−28 inches Hg"), the ON/OFF valve 654 can be turned on to infuse electrolyte into the compressed dry powder mixture via the inlet port 644 in the bottom manifold 640. In this configuration, continuous evacuation takes place until the infused electrolyte reaches the top of the compressed dry powder mixture, which is substantially similar to an operational scheme described above in FIG. 5.

Another exemplary embodiment of an infusion apparatus 710 is shown in FIG. 7. This configuration is substantially similar to the infusion apparatus 510 as shown in FIG. 5, except for the placement of porous media. Like the infusion apparatus 510, the infusion apparatus 710 can also include a top manifold 720, a container 730 that defines an inner volume 732, and a bottom manifold 740. The container 730 can be coupled to the bottom manifold 740 and a dry powder mixture (shown as black) can be added to the inner volume 732. The top manifold 720 includes a piston 722 that is movable with respect to the container 730 to compress the dry powder mixture inside the inner volume 732.

Unlike the infusion apparatus 510 in which the compressing surface of the piston 522 and the surface of the bottom manifold 540 are both configured with respective porous media 542a and 542b, the infusion apparatus 710 includes a radial porous media 742 that is configured to cover an entire inner circumferential surface of the container 730 (although the illustration in FIG. 7 only shows the two vertical slabs on the outer edges of the container 730). The inclusion of radial porous media 742 forces the paths of evacuation and/or infusion outward radially, instead of upward and/or downward directions as in previous configurations described above with reference to FIG. 5. This change of path occurs even though the ports 724 and 744 are placed in the top manifold 720 and the bottom manifold 740, respectively. The placement of radial porous media 742 effectively creates a more uniform treatment of the compressed dry powder mixture regardless of which port or ports are used: Both the evacuation of trapped air and/or the infusion of electrolyte into the compressed dry powder mixture can take place radially.

The rest of the configuration, connection and operation schemes of the infusion apparatus 710 are substantially similar to and/or the same as the infusion apparatus 510, described above with reference to FIG. 5, and therefore, the infusion apparatus 710 is not described in further detail herein.

Figure 8A:
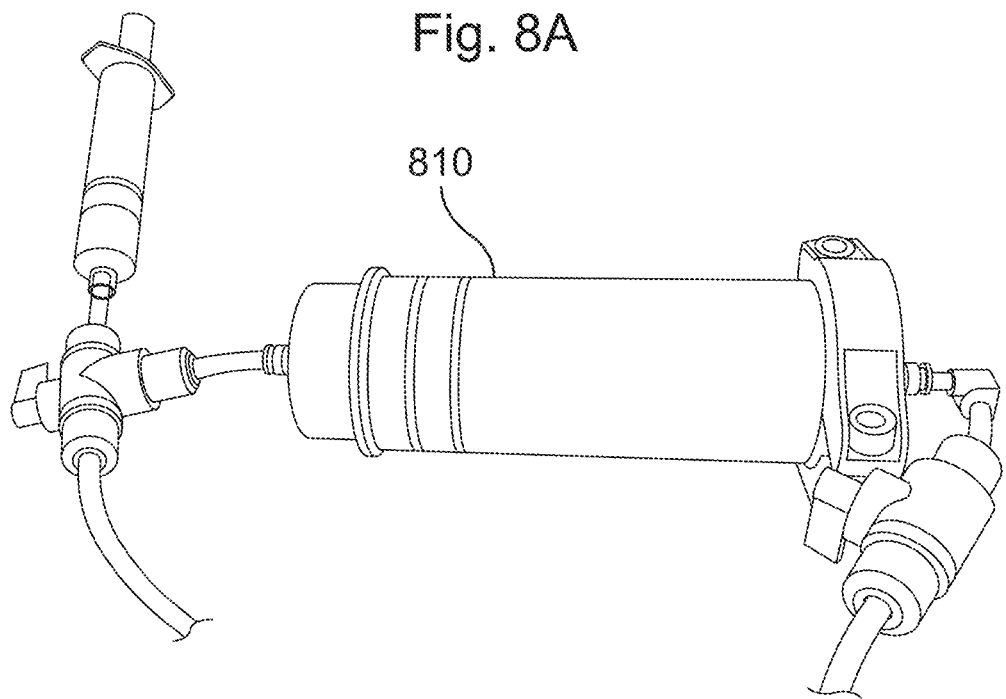
FIGS. 8A-8D are a series of photographic images showing post infusion mixing procedure of the infusion manufacturing process, according to an embodiment.
Figure 8B:
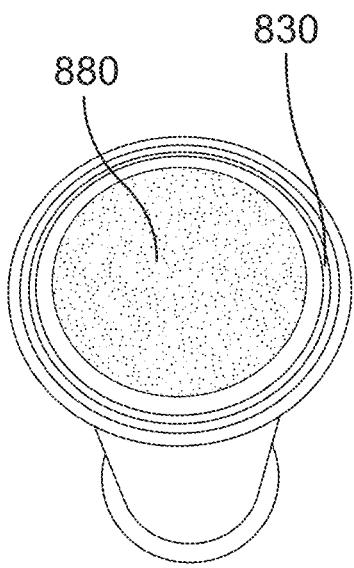
Figure 8C:
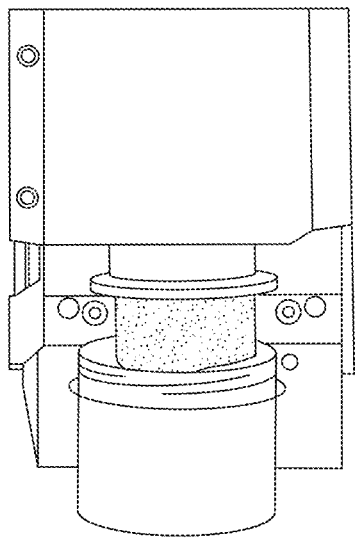
Figure 8D:
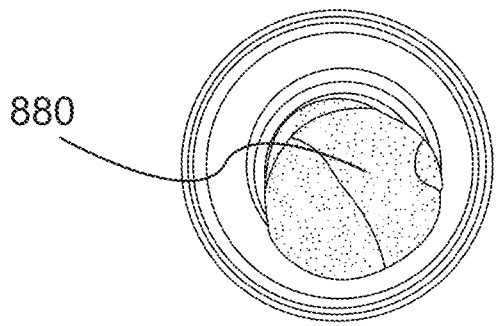

FIGS. 8A-8D are a series of photographic images showing post infusion mixing procedure of the infusion manufacturing process, according to an embodiment. The photographic image of FIG. 8A shows the infusion apparatus 810 in operation using one of the operational configurations described above with reference to FIGS. 3-7. Once the working electrode material 880, shown inside a container 830 in FIG. 8B, has been produced by infusion of electrolyte into a compressed dry powder mixture, the working electrode material can be extruded, according to one embodiment, as shown in FIG. 8C. The extruded working electrode material 880 is shown in a bowl in FIG. 8D. This process illustrates one particular embodiment of a manufacturing process that incorporates infusion mixing and extrusion to form a semi-solid electrode.

FIG. 9 shows a representative plot 900 of conductivity in working electrode materials versus stiffness in the working electrode materials. The plot 900 compares the working electrode materials produced using an infusion manufacturing process as described herein to those produced using a non-infusion ("standard") manufacturing processes. As indicated by arrow DD in the plot 900, one particular working electrode having a relatively high conductivity value was produced by an infusion manufacturing process. This high conductivity can be achieved at least in part by having a relatively stiffer working electrode material content produced by the in situ compression, evacuation and electrolyte infusion process. Hence, it has been shown that the infusion mixing and manufacturing process can produce working electrode materials with high conductivity and high stiffness as well as, if not better than non-infusion processing techniques.

Figure 10A:
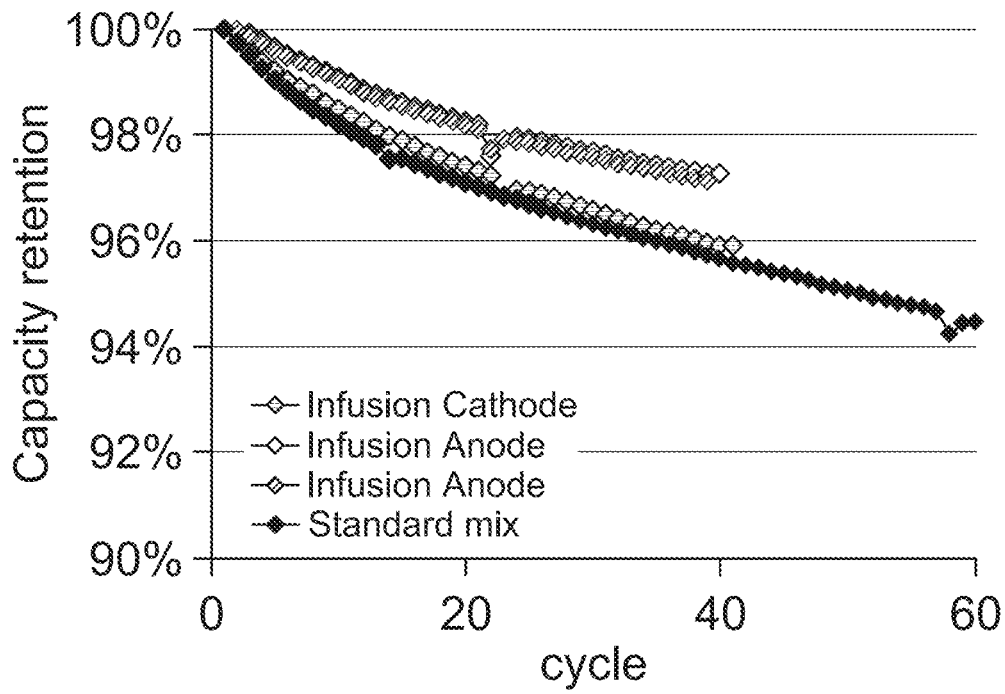
FIGS. 10A and 10B show the electrochemical performance versus short-term cycle life of several exemplary working electrode materials produced by an infusion manufacturing process and a non-infusion process.
Figure 10B:
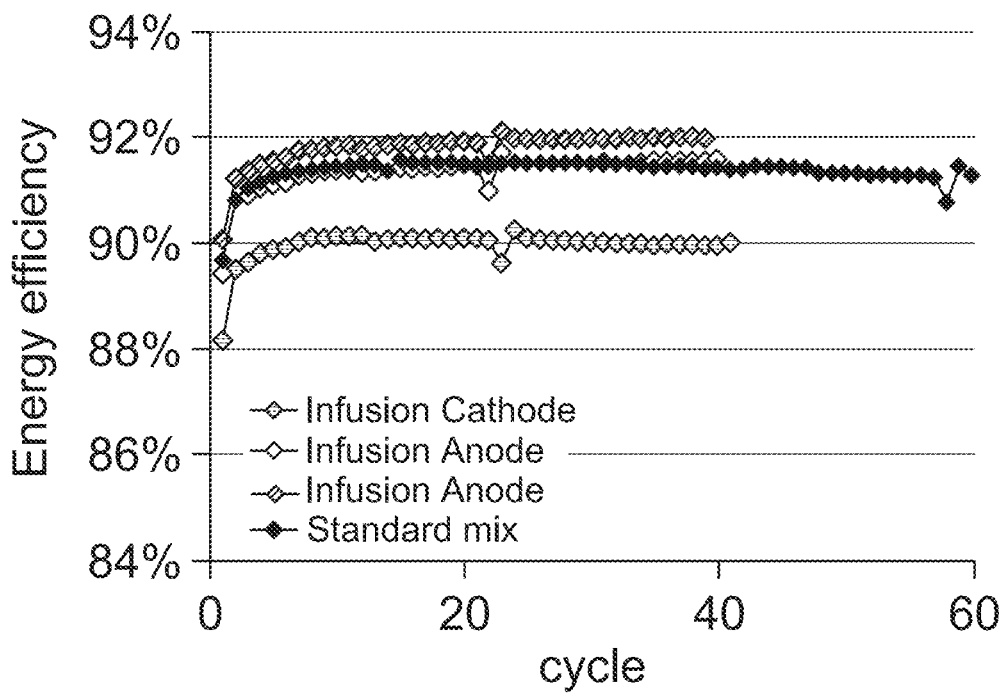

Referring now to FIG. 10A, a plot 1000a shows the short-term cycle life versus capacity retention of several exemplary working electrode materials produced by an infusion manufacturing process and a non-infusion process. As shown in the plot 1000a, the working electrode materials produced by infusion mixing and manufacturing processes have better capacity retention than the standard mix. Referring now to FIG. 10B, a plot 1000b shows the comparison of energy efficiency of various electrode materials as a function of short-term cycle life.

Figure 11A:
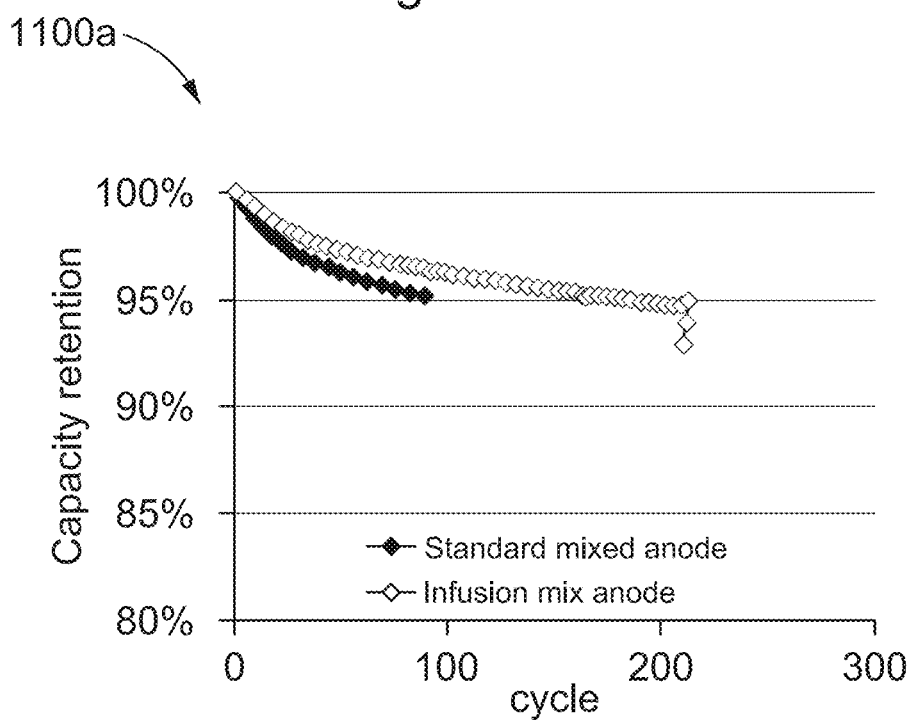
FIGS. 11A and 11B show the electrochemical performance versus long-term cycle life of several exemplary working electrode materials produced by an infusion manufacturing process and a non-infusion process.

Further analysis of the electrochemical performance of working electrode materials produced by an infusion manufacturing process and a non-infusion process is shown in a plot 1100a in FIG. 11A. In this plot 1100a, the capacity retention for the infusion mix anode and the standard mix anode are compared as a function of longer-term cycle life. As shown in the plot 1100a, the infusion mix anode can retain about 97% of its original capacity at about 100 cycles and loses additional 2% capacity to retain about 95% of its original capacity after 100 additional charge-recharge cycles. While the infusion mix anode manages to lose 5% of capacity after a total of 200 cycles, the standard mixed anode loses the same amount of capacity only after 100 cycles. This clearly illustrates the effectiveness of infusion mixing and manufacturing process described herein.

Figure 11B:
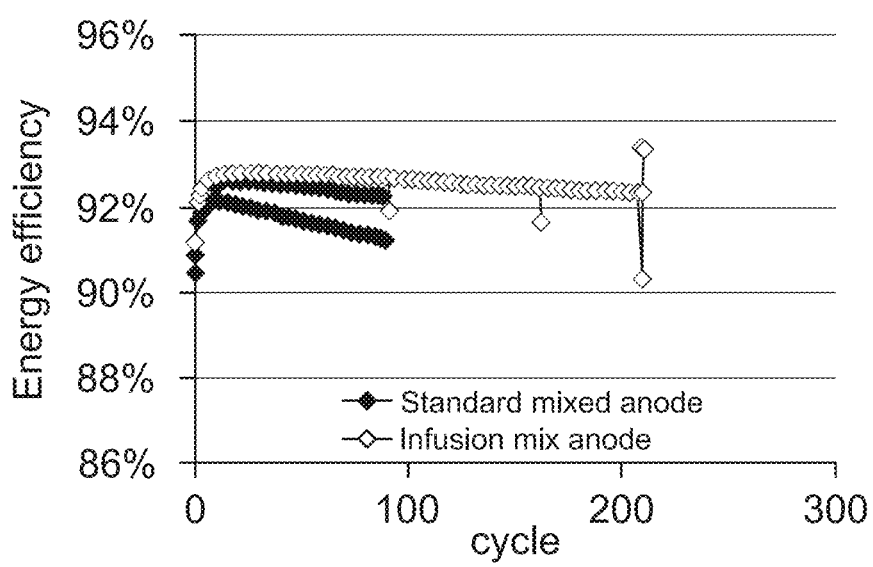

FIG. 11B shows a plot 1100b displaying the electrochemical performances of working electrode materials produced by an infusion manufacturing process and a standard process. Here, the higher energy efficiency of about 92.5% maintained by the infusion mix anode over 200 charge-discharge cycles clearly illustrates that the infusion manufacturing process can produce anodes that are more energy efficient over longer charge-discharge cycles than anodes prepared using the standard manufacturing techniques. This clearly exemplifies the effectiveness of infusion mixing and manufacturing process described herein.

As described herein, an infusion mixing process can be used to prepare a working electrode mixture in a container, which can later be extruded from the container to form a finished electrode. In some embodiments the infusing mixing process can be used to form a finished electrode in situ. Referring now to FIGS. 12A-12I, an infusing manufacturing process can be used to directly produce single-sided finished electrodes by incorporating in situ compression and infusion of electrolytes in a single processing apparatus.

FIG. 12A shows an infusion mixing die set 1200 for direct electrode manufacturing. The infusion mixing die set 1200 includes a top die 1220 and a bottom die 1240 that defines an inner volume 1242. In some embodiments, the top die 1220 can be movable with respect to the bottom die 1240 and can include a piston 1222 that is configured to apply compressive force to a dry powder mixture (not shown) disposed in the inner volume 1242. In other words, the top die 1220 can be used to seal the inner volume 1242 and act as the piston 1222 to compress the dry powder mixture.

As shown in FIG. 12A, the top die 1220 includes an inlet/outlet port 1224 configured to be coupled to a vacuum source (not shown) and/or an electrolyte supply (not shown). Although the port 1224 is shown in as being included in the top die 1220, it can be included in the bottom die 1240. In some embodiments, multiple ports 1224 can be included in the top die 1220, the bottom die 1240, or in both. In some embodiments, multiple ports 1224 can be included in the die set 1200 with each port 1224 to be used for one specific purpose, such as for example, only for evacuating or only for infusion of electrolyte. In some embodiments, the bottom surface (compressing surface) of the piston 1222 can include a base plate (not shown) with a plurality of apertures (also referred to as a porous media), which serves as a permeable medium for evacuating trapped air or for infusing electrolyte into the inner volume 1242.

The first step of the direct electrode manufacturing is illustrated in FIG. 12B. A laminated foil with frame 1234 is disposed into the inner volume 1242 of the bottom die 1240. In some embodiments, the laminated foil is the current collector for a working electrode and is supported by the frame 1234 to ensure mechanical rigidity during transport. The lateral dimensions of the frame 1234 comprising the laminated foil is substantially similar or the same as the dimensions of the inner volume 1242. Said another way, the frame 1234 can fit perfectly in the inner volume 1242.

Once the frame 1234 comprising the laminated foil is disposed into the inner volume 1242, a spacer 1232 is disposed on top of the frame 1234, as shown in FIG. 12C. Inside the inner volume 1242, the spacer 1232 is positioned directly above the frame 1234, such that the inner dimensions of the spacer 1232 and the inner dimensions of the frame 1234 are substantially similar or the same. Said another way, once a dry powder mixture 1270 is disposed into the inner dimensions of the spacer 1232, both the spacer 1232 and the frame 1234 can help define the lateral dimensions of the dry powder mixture 1270 (and thus also of the finished electrode), as shown in FIG. 12D. The lateral (outer) dimensions of the spacer 1232 are also substantially similar or the same as the (outer) dimensions of the frame 1234 and the dimensions of the inner volume 1242. Said another way, both the spacer 1232 and the frame 1234 can fit perfectly in the inner volume 1242. In addition, the spacer 1232, when placed properly inside the inner volume 1242, is leveled against the top of the inner volume 1242 (top of the bottom die 1240). In other words, the top surface of the spacer 1232 is at the same height or substantially close to the top surface of the inner volume 1232 (top of the bottom die 1240). Therefore, the height of the spacer 1232 can roughly define the uniformity in the amount of dry powder mixture 1270 disposed on top and across the length of the underlying laminated foil.

To ensure evenness after the disposing of the dry powder mixture 1270, as shown in FIG. 12E, a doctor blade 1250 can be used to sweep across the surface of the dry powder mixture 1270 against the top of the spacer 1232 and the top of the bottom die 1240. Any excess dry powder mixture 1270 can be swept away, leaving an evenly distributed dry powder mixture 1270 with a uniform thickness ready for the next processing step.

FIG. 12F shows the compressing step using the top die 1220 and the piston 1222. As indicated by the directional arrows EE, a pressure is exerted onto the dry powder mixture 1270 by moving the piston 1222/the top die 1220 with respect to the bottom die 1240. The die set 1200 is designed so that the compressing piston 1222 is substantially aligned with the inner dimensions of the spacer 1232. Said another way, the later dimensions of the piston 1222 are substantially similar or the same as the inner dimensions of the spacer 1232 and therefore the piston 1222 can fit perfectly or almost perfectly inside the spacer 1232. The piston 1222/the top die 1220 can move and can compress the dry powder mixture 1270 a predetermined amount to achieve a predetermined density and volume ratio of the solids to electrolyte as described in earlier embodiments above.

FIG. 12G shows an illustration of the sealed die set 1200 after the top die 1220 and the bottom die 1240 move with respect to each other to compress the dry powder mixture 1270 to a predetermined amount. Once sealed, a vacuum can be applied via the port 1224 to evacuate trapped air. After the pressure level inside the die set 1200 is lowered to a predetermined pressure level, the evacuation is stopped and the infusion of electrolyte can commence. After electrolyte is infused a predetermined amount into the compressed and degassed dry powder mixture 1270, the infusion is stopped. Both the evacuation and infusion steps are substantially similar to the embodiments described in earlier embodiments and therefore are not described in detail in this embodiment.

FIG. 12H shows an illustration after the top die 1220 and the spacer 1232 are removed from the bottom die 1240 to reveal a working electrode 1280 disposed inside the inner volume 1242. The finished working electrode 1280, removed from the bottom die 1240, is shown with the frame 1234 in FIG. 12I.

Figure 13E:
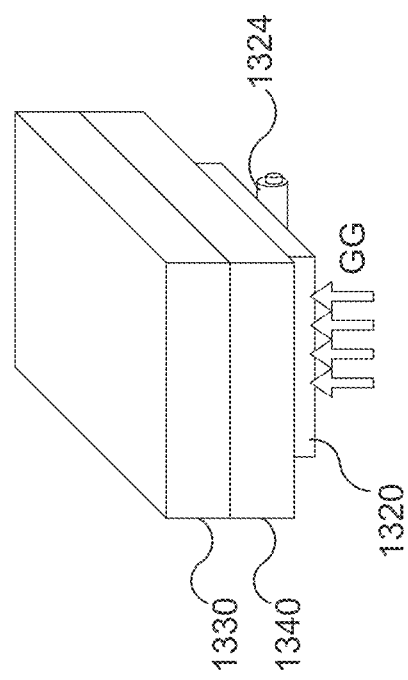
FIGS. 13A-13N show an infusing manufacturing process that can be used to directly produce double-sided finished electrodes by incorporating in situ compression and infusion of electrolytes in a single processing apparatus.

The direct electrode manufacturing as described in FIGS. 12A-12I for producing single-side electrodes can be modified to produce double-sided finished electrodes. Referring now to FIGS. 13A-13N, an infusion manufacturing process can be used to directly produce double-sided finished electrodes by incorporating in situ compression and infusion of electrolytes in a single process apparatus, according to an embodiment. Using an infusion mixing die set 1300, an embodiment of manufacturing one side of the double-sided finished electrode is illustrated in FIGS. 13A-13G and the manufacturing of the other side of the double-sided finished electrode is illustrated in FIGS. 13H-13N.

FIG. 13A shows the infusion mixing die set 1300 for manufacturing the first side of the double-sided electrode. The die set 1300 includes a top die 1320 and a middle die 1330 that are coupled together as shown in FIG. 13A to form an inner volume 1332 and a dry powder mixture (not shown) can be added to the inner volume 1332. In some embodiments, the top die 1320 can be movable with respect to the middle die 1330 and can include a piston 1322 (not yet shown) that is configured to apply compressive force to the dry powder mixture disposed in the inner volume 1332.

The top die 1320 includes an inlet/outlet port 1324 configured to be coupled to a vacuum source (not shown) and/or an electrolyte supply (not shown). Although the port 1324 is shown in as being included in the top die 1320, it can be included in the middle die 1330. In some embodiments, multiple ports 1324 can be included in any of the top die 1320 and the middle die 1330. In some embodiments, multiple ports 1324 can be included in the die set 1300 with each port 1324 to be used for one specific purpose, such as for example, only for evacuating or only for infusion of electrolyte. In some embodiments, the compressing surface of the piston 1322 can include a plurality of apertures (referred herein as a porous media 1302), which serves as a permeable medium for evacuating trapped air or for infusing electrolyte into the inner volume 1332.

Shown in FIG. 13B is a mesh foil 1304 disposed inside the inner volume 1332 of the middle die 1330. The mesh foil 1304 serves as the current collector for the finished electrodes. The porosity in the mesh foil 1304 allows for diffusion and traversing of air and/or electrolyte during the evacuation and infusion steps.

Once the mesh foil 1304 is placed over the porous media 1302 inside the middle die 1330, a dry powder mixture 1370 can be disposed into the inner volume 1332 as shown in FIG. 13C. In this step, the dry powder mixture 1370 can be disposed inside the inner volume 1332 to fill up to the top of the middle die 1330 to ensure there is a minimum amount of dry powder mixture across the entire mesh foil 1304.

FIG. 13D illustrates that a doctor blade 1350 can be used to sweep across the surface of the dry powder mixture 1370 against the top of the middle die 1330 to remove any excess dry powder mixture 1370. The result is an evenly distributed dry powder mixture 1370 with a uniform thickness ready for the next processing step.

Once the dry powder mixture 1370 is leveled using the doctor blade 1350, a separator 1306 (a porous membrane) can be disposed on top of the dry powder mixture 1370 so as to cover the entire surface of the dry powder mixture 1370, as shown in FIG. 13E. After the separator 1306 is firmly placed, the bottom die 1340 is disposed onto middle die 1330 as indicated by the arrow FF in the illustration in FIG. 13E.

Figure 13F:
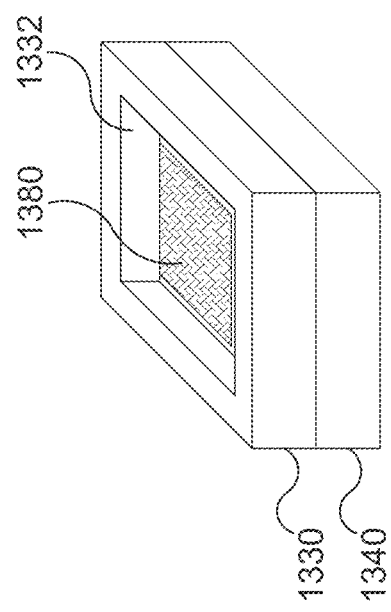

After the bottom die 1340 and the middle die 1330 are fully pressed against each other, i.e., substantially closed or sealed, a pressure can be exerted via the top die 1320 by moving the piston 1322 (not shown) in the direction as indicated by the arrows GG in FIG. 13F. The compression of the dry powder mixture 1370 takes place in this step by the compressing piston 1322 moving with respect to the middle die 1330 inside the inner volume 1332.

Figure 13G:
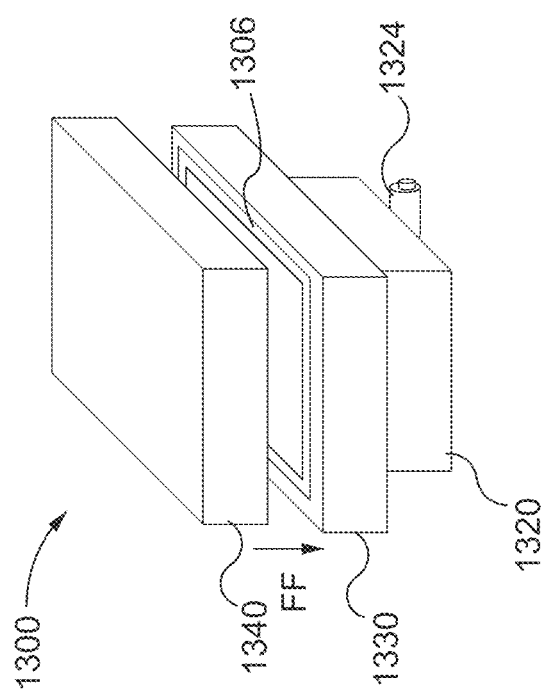

FIG. 13G is the illustration of the infusion mixing die set 1300 rotated from the view in FIG. 13F. Once the dry powder mixture is compressed to a desired displacement level, the inner volume is evacuated by drawing vacuum via the port 1324. The evacuation of the infusion mixing die set 1300 can stop after the pressure level is lowered to a determined pressure level.

Figure 13H:
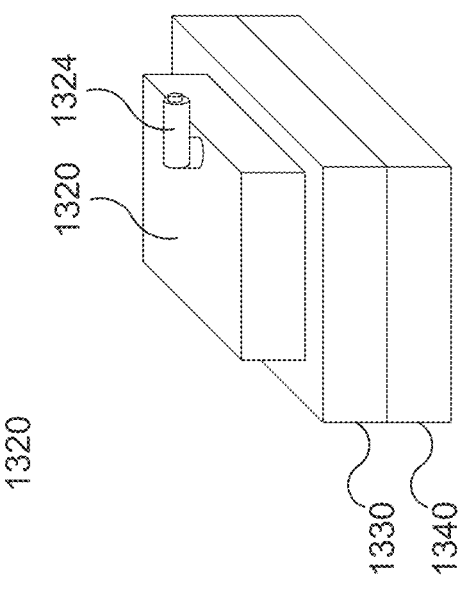
Figure 13J:
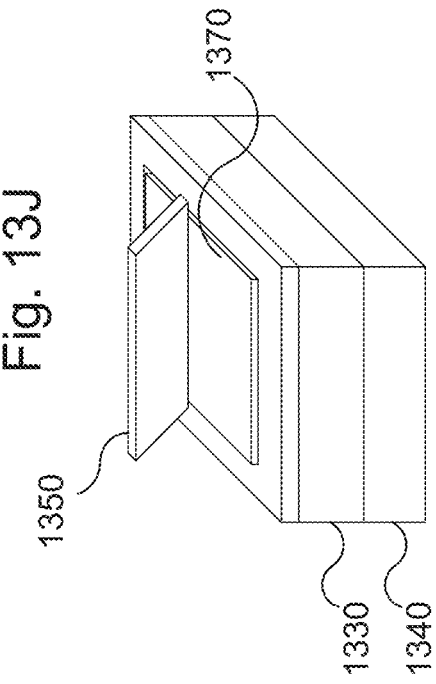
Figure 13L:
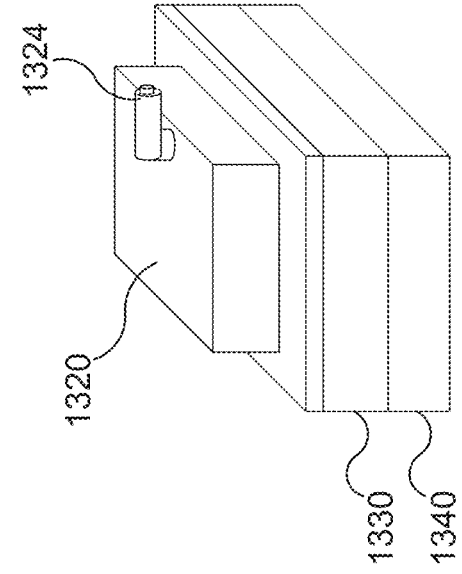

FIG. 13H shows the infusion mixing die set 1300 without the top die 1320. After degassing the compressed dry powder mixture 1370, half of the electrode 1380 is produced and disposed inside the inner volume 1332 as shown in FIG. 13H. The illustration shown here is the half electrode 1380 with the top surface being the mesh foil 1304.

Figure 13I:
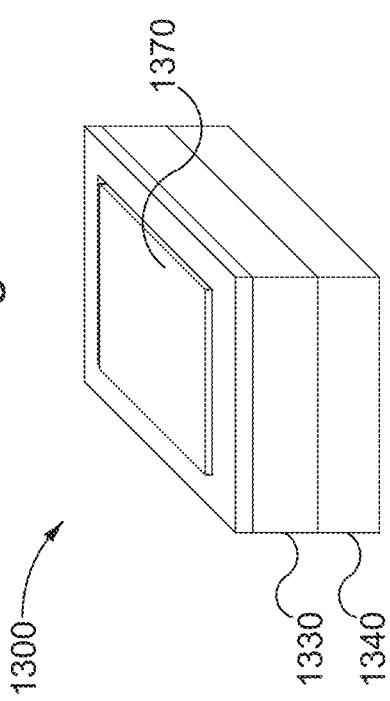
Figure 13K:
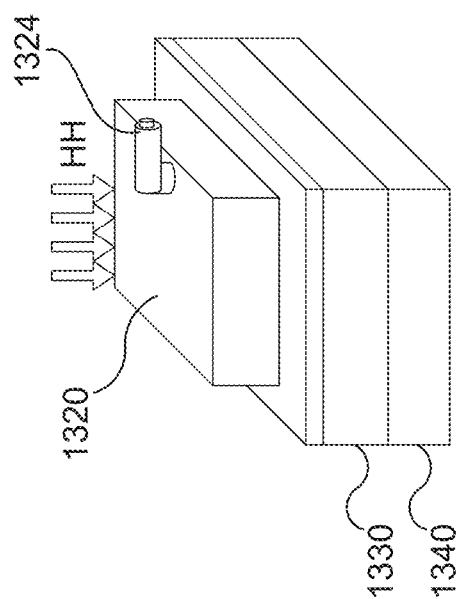
Figure 13M:
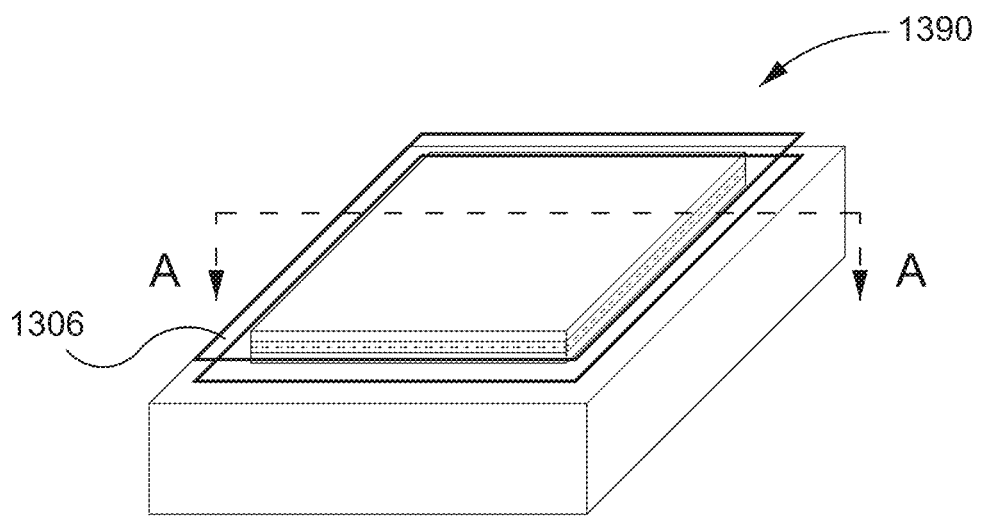
Figure 13N:
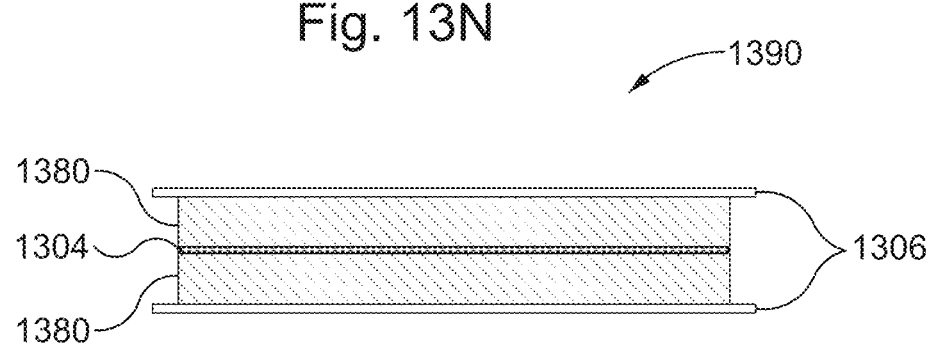

Another batch of the dry powder mixture 1370 can be disposed onto the mesh foil 1304 of the half electrode 1380 disposed inside the inner volume 1332 as shown in FIG. 13I. Like in the earlier step, the dry powder mixture 1370 can be disposed inside the inner volume 1332 to fill up to the top of the middle die 1330 to ensure there is a minimum amount of dry powder mixture across the entire mesh foil 1304.

FIG. 13J, similarly to FIG. 13.D, illustrates that a doctor blade 1350 can be used to sweep across the surface of the dry powder mixture 1370 against the top of the middle die 1330 to remove any excess dry powder mixture 1370. The result is an evenly distributed dry powder mixture 1370 with a uniform thickness ready for the next processing step.

Now, the top die 1320 can be placed onto the evenly distributed dry powder mixture 1370 for another compression step. Once the infusion mixing die set 1300 is sealed shut, a pressure can be applied to the dry powder mixture 1370 via the compressing piston 1322 of the top die 1320 in the direction, as indicated by the arrows HH in FIG. 13K. The pressure is applied to achieve a predetermined amount to achieve a predetermined density and volume ratio of the solids to electrolyte as described in earlier embodiments above.

After the desired compression is reached, FIG. 13L shows that a vacuum can be applied via the port 1324 to evacuate trapped air. After the pressure level inside the die set 1300 is lowered to a predetermined pressure level, the evacuation is stopped and the infusion of electrolyte can commence. Here the infusion of electrolyte reaches both sides of the double-sided electrodes via the mesh foil 1304. After electrolyte is infused a predetermined amount into the compressed and degassed dry powder mixture 1370, the infusion is stopped. Both the evacuation and infusion steps are substantially similar to the embodiments described in earlier embodiments and therefore are not described in detail in this embodiment.

FIG. 13N shows the finished double-side electrode 1390 covered with a second separator 1306 (a porous membrane) disposed on top of one side of the working electrodes 1380. After the separator 1306 is firmly placed, the cross-section, indicated by double-arrow A-A, of the finished double-sided electrode is shown in FIG. 13N. The finished double-sided electrode 1390 has two working electrodes with a common current collector (mesh foil 1304) sandwiched by the separators 1306.

The invention claimed is:

1. A method of preparing a semi-solid electrode, the method comprising:
combining an active material with a conductive material to form an intermediate material;
compressing the intermediate material to form a compressed intermediate material;
infusing an electrolyte into the compressed intermediate material to form an electrode material; and
dispensing the electrode material onto a current collector to form a final electrode, the final electrode including a mixture of a solid phase and a liquid phase.

2. The method of claim 1, further comprising:
drawing a vacuum on the compressed intermediate material.

3. The method of claim 2, wherein the vacuum is drawn prior to infusion of the electrolyte.

4. The method of claim 2, wherein the vacuum is drawn during infusion of the electrolyte.

5. The method of claim 1, wherein the electrolyte is infused via a plurality of inlet ports.

6. The method of claim 1, further comprising:
drawing a vacuum on the compressed intermediate material via a plurality of outlet ports.

7. The method of claim 2, wherein the vacuum is drawn to reduce pressure to less than or equal to −28 inches Hg.

8. A method of preparing a semi-solid electrode, the method comprising:
mixing an active material and a conductive material in a mixer to form an intermediate material;
compressing the intermediate material to form a compressed intermediate material;
drawing a vacuum on the compressed intermediate material;
transferring an electrolyte to the compressed intermediate material to form an electrode material; and
dispensing the electrode material onto a current collector to form a final electrode, the final electrode including a mixture of a solid phase and a liquid phase.

9. The method of claim 8, further comprising:
evacuating a vessel in which the compressed intermediate material is disposed to reduce pressure in the vessel.

10. The method of claim 9, wherein the pressure in the vessel is reduced to an inner-vessel gauge pressure of less than or equal to −28 inches Hg.

11. The method of claim 9, wherein the evacuation of the vessel is performed prior to infusion of the electrolyte.

12. The method of claim 9, wherein the evacuation of the vessel is performed during infusion of the electrolyte.

13. A method of preparing a semi-solid electrode, the method comprising:
combining an active material with a conductive material to form an intermediate material;
compressing the intermediate material to form a compressed intermediate material;
transferring a wetting agent to the compressed intermediate material;
infusing an electrolyte into the compressed intermediate material to form an electrode material; and
dispensing the electrode material onto a current collector to form a final electrode, the final electrode including a mixture of a solid phase and a liquid phase.

14. The method of claim 13, further comprising:
drawing a vacuum on the compressed intermediate material prior to transferring the wetting agent to the intermediate material.

15. The method of claim 13, further comprising:
drawing a vacuum on the compressed intermediate material prior to infusion of the electrolyte into the compressed intermediate material.

16. The method of claim 13, further comprising:
drawing a vacuum on the compressed intermediate material during a first time period prior to transferring the wetting agent to the intermediate material; and
drawing a vacuum on the compressed intermediate material during a second time period prior to transferring the wetting agent to the intermediate material.

17. The method of claim 13, further comprising:
drawing a vacuum on the compressed intermediate material to achieve an inner-chamber gauge pressure of less than or equal to −28 inches Hg.

18. The method of claim 13, further comprising:
drawing a vacuum on the compressed intermediate material to achieve an inner-chamber gauge pressure of less than or equal to −28 inches Hg prior to the electrolyte infusion.

19. The method of claim 13, wherein the active material and the conductive material are combined in a vessel of a mixer and mixed to form the intermediate material.

* * * * *